US006600311B1

(12) United States Patent
Tawaratsumida et al.

(10) Patent No.: US 6,600,311 B1
(45) Date of Patent: Jul. 29, 2003

(54) MAGNETIC SENSOR FOR DETECTING THE ANGULAR DISPLACEMENT OF A ROTATING SHAFT

(75) Inventors: Sukoya Tawaratsumida, Osaka (JP); Katsuhiro Teramae, Osaka (JP)

(73) Assignee: Matsushita Electric Works, Ltd., Osaka (JP)

( * ) Notice: Subject to any disclaimer, the term of this patent is extended or adjusted under 35 U.S.C. 154(b) by 0 days.

(21) Appl. No.: 09/577,163

(22) Filed: May 24, 2000

(30) Foreign Application Priority Data

May 26, 1999 (JP) .......................................... 11-147336

(51) Int. Cl.[7] .............................................. G01B 7/30
(52) U.S. Cl. ............................ 324/207.25; 324/207.16; 324/207.22
(58) Field of Search ....................... 324/207.16, 207.25, 324/207.17, 207.22, 207.18, 207.19

(56) References Cited

U.S. PATENT DOCUMENTS

| 3,665,258 | A | * | 5/1972 | McIntosh | 317/132 |
| 3,961,243 | A | * | 6/1976 | Schulz | 324/207.19 |
| 4,250,416 | A | * | 2/1981 | Watanabe et al. | 310/13 |
| 4,638,250 | A | * | 1/1987 | Shen-Orr et al. | 324/207 |
| 4,866,378 | A | * | 9/1989 | Redlich | 324/207.19 |
| 5,107,211 | A | * | 4/1992 | Rose | 324/207.16 |
| 5,539,308 | A | * | 7/1996 | Teramae et al. | 324/173 |
| 5,652,510 | A | * | 7/1997 | Kyodo | 324/207.16 |
| 5,743,143 | A | * | 4/1998 | Carpenter et al. | 74/335 |
| 5,867,022 | A | * | 2/1999 | Eden et al. | 324/207.16 |

FOREIGN PATENT DOCUMENTS

| JP | 2-147802 | 6/1990 |
| JP | 4-236301 | 8/1992 |
| JP | 6-3103 | 1/1994 |
| JP | 6-26950 | 2/1994 |
| JP | 6229707 | 8/1994 |
| JP | 6294690 | 10/1994 |

OTHER PUBLICATIONS

English Language Abstract of JP 4–236301.
English Langauage Abstract of JP 2–147802.
English Language Abstract of JP 6–3103.
English Language Abstract for JP Appl. No. 6–294690.
English Language Abstract for JP Appl. No. 6–229707.
English Language Abstract of JP 6–26950.

* cited by examiner

Primary Examiner—N. Le
Assistant Examiner—Darrell Kinder
(74) Attorney, Agent, or Firm—Greenblum & Bernstein, P.L.C.

(57) ABSTRACT

A sensor is configured to comprise a detection coil 1 into which a metallic shaft 2 to be detected, a reference coil 5 having the same specifications as those for the detection coil 1, drive oscillator circuits 3, 6 for generating high-frequency magnetic fields in the detection coil 1 and the reference coil 5, and a comparator 10 for outputting a detection signal, which indicates that the shaft 2 to be detected is detected, according to the difference between an oscillation signal, which is outputted from the detection coil 1 according to an inserted state of the shaft 2 to be detected, and an oscillation signal outputted from the reference coil 5.

8 Claims, 19 Drawing Sheets

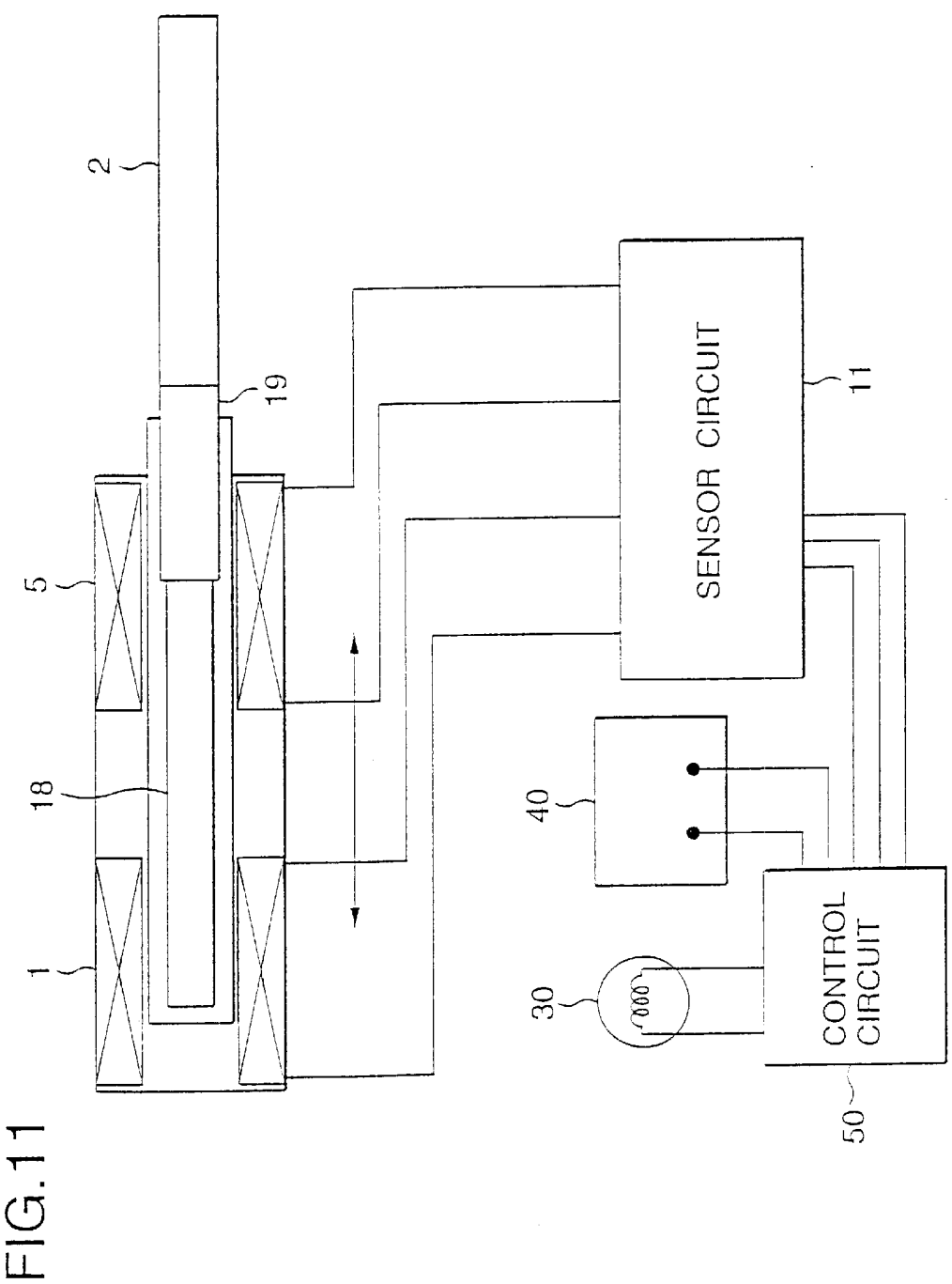

PRIOR ART

PRIOR ART

MAGNETIC SENSOR FOR DETECTING THE ANGULAR DISPLACEMENT OF A ROTATING SHAFT

BACKGROUND OF INVENTION

1. Field of Invention

The present invention relates to magnetic sensors, such as an AT sensor, for use in a transmission of an automobile.

2. Related Art

Hitherto, as a sensor of such a kind, there has existed a sensor illustrated in FIGS. 14 and 15. This sensor is an AT sensor for use in an automobile, and has a coil AA and a drive oscillator circuit BB. In the coil AA, a metallic shaft CC is inserted. The drive oscillator circuit BB generates a high-frequency magnetic field in the coil AA. The coil AA of this sensor outputs detection signals according to an inserted state of the shaft CC, as indicated by a solid line in FIG. 16. Thus, the inserted state of the shaft CC can be detected. That is, it can be detected which of positions P to 3 shown in FIG. 14 the shaft CC moves and is inserted to.

In the conventional sensor, the characteristics of the coil AA itself vary with temperature. Therefore, the level of the detection signal outputted according to the inserted state of the shaft CC varies as indicated by dashed lines in FIG. 16. Consequently, the conventional sensor has a problem in that the position of the shaft cannot be accurately detected.

SUMMARY OF INVENTION

The present invention is accomplished by directing attention to this problem. Accordingly, an object of the present invention is to provide a magnetic sensor that can accurately detect the position of the shaft even when the characteristics of a coil itself vary according to a change in temperature or the like.

Another object of the present invention is to provide a magnetic sensor that is free from a magnetic influence to a sensor coil portion of a metal rotating shaft as an object to be detected, and the magnetic sensor is achieved to be minimized. Further, if the rotating shaft is thermally expanded, there is not changed the position relationship between the metal rotating shaft and the sensor coil portion, and the magnetic sensor is also free from the temperature compensation under the sensor mounting condition.

To resolve the problem, according to the first aspect of the present invention, there is provided a sensor that comprises a detection coil into which a metallic shaft to be detected, a reference coil having the same specifications as those for the detection coil, drive oscillator circuits for generating high-frequency magnetic fields in the detection coil and the reference coil, and a comparator for outputting a detection signal, which indicates that the shaft to be detected is detected, according to the difference between an oscillation signal, which is outputted from the detection coil according to an inserted state of the shaft to be detected, and an oscillation signal outputted from the reference coil.

A second aspect of the present invention is configured so that a reference shaft having the same specifications as those for the shaft to be detected is inserted into the reference coil, in the sensor according to the first aspect.

A third aspect of the present invention is configured so that the drive oscillator circuits are adapted to generate the high-frequency magnetic field according to the oscillation signal outputted from the reference coil, in the sensor according to the first or second aspect of the present invention.

A fourth aspect of the present invention is configured in such a manner as to further comprise shield members for providing magnetic shielding between the detection coil and the reference coil, in addition to the constituent elements of the sensor according to one of the first to third aspect.

A fifth aspect of the present invention, there is provided a sensor that comprises a detection coil, a reference coil, which is series-connected to the detection coil and has the same specifications as those for the detection coil, a metallic common shaft to be inserted into the detection coil and the reference coil so that a total of a dimension of a part thereof, which is inserted into the detection coil, and a dimension of a part thereof, which is inserted into the reference coil, is a predetermined dimension, a shaft to be detected, which is disposed in such a way as to be able to drive the common shaft in a direction in which the common shaft is inserted into each of the detection coil and the reference coil, drive oscillator circuits for generating high-frequency magnetic fields in the detection coil and the reference coil, and a comparator for outputting a detection signal, which indicates that the common shaft is detected, according to the difference between oscillation signals respectively outputted from the detection coil and the reference coil according to an inserted state of the common shaft.

A sixth aspect of the present invention is configured so that the drive oscillator circuits are adapted to generate the high-frequency magnetic field according to the oscillation signal outputted from the reference coil, in the sensor according to fifth aspect of the present invention.

A seventh aspect of the present invention is configured so that the detection coil and the reference coil constitute a bridge circuit together with a first bridge element and a second bridge element, and that each of the first and second bridge elements is a capacitor constituted by a chip component, in the sensor according to the fifth or sixth aspect.

According to the eighth aspect of the present invention, there is provided the magnetic sensor comprising a rotating shaft rotating interlockingly with the object to be detected, an arc-shaped metal member interlocked with the rotation of the rotating shaft and moving on a circular trajectory thereof with said rotating shaft serving as a center thereof, a sensor coil portion fixed on the circular trajectory with a center axis bending to an arc-shaped in order to freely adjust an occupation amount with respect to the magnetic circuit in response to the movement of the metal member into a center air core of the sensor coil portion and a sensor circuit generating a signal corresponding to a rotation angle of the rotation shaft by detecting a magnetically change of the sensor coil portion generated in response to the movement of the metal member in the sensor coil portion under a condition that a modulated magnetic field with a high frequency is generated by driving and exciting the sensor coil portion.

A ninth aspect of the present invention, there is provided a magnetic sensor comprising a rotating shaft rotating interlockingly with the object to be detected, an arc-shaped metal member fixedly arranged on a circular trajectory thereof with said rotating shaft serving as a center thereof, a sensor coil portion with a center axis along the circular trajectory, moving on the circular trajectory by interlocking the rotation of the rotating shaft, the sensor coil portion formed in an arc-shaped in order to freely adjust an occupation amount with respect to the magnetic circuit in response to the movement of the metal member into the center air-core of the sensor coil portion and a sensor circuit generating a signal corresponding to a rotation angle of the rotation shaft by detecting a magnetically change of the sensor coil portion generated in response to the movement of the metal member in the sensor coil portion under a condition that a modulated magnetic field with a high frequency is generated by driving and exciting the sensor coil portion.

A tenth aspect of the present invention, the sensor coil portion includes two sensor coils arranged such that sensors are arranged symmetrically with respect to a line passing through the rotation shaft serving as a rotation center, the arm portions extending from the middle point of the metal member are inserted into each sensor coil, respectively, when the rotation shaft rotates from the rotation angle 0°, the relationship between an occupation amount with respect to the magnetic circuit in response to the movement of one arm portion into the corresponding sensor coil and an occupation amount with respect to the magnetic circuit in response to the movement of the other arm portion into the corresponding sensor coil is maintained in the complementary change. The sensor circuit generates a signal corresponding he rotation angle of the rotation shaft on the basis of the magnetically change with respect to the both sensor coils.

BRIEF DESCRIPTION OF DRAWINGS

FIG. 11 is a diagram illustrating a state in which a common shaft is inserted into a detection coil of the fifth embodiment of the present invention.

DETAILED DESCRIPTION OF PREFERRED EMBODIMENTS

First Embodiment

Figure 1:
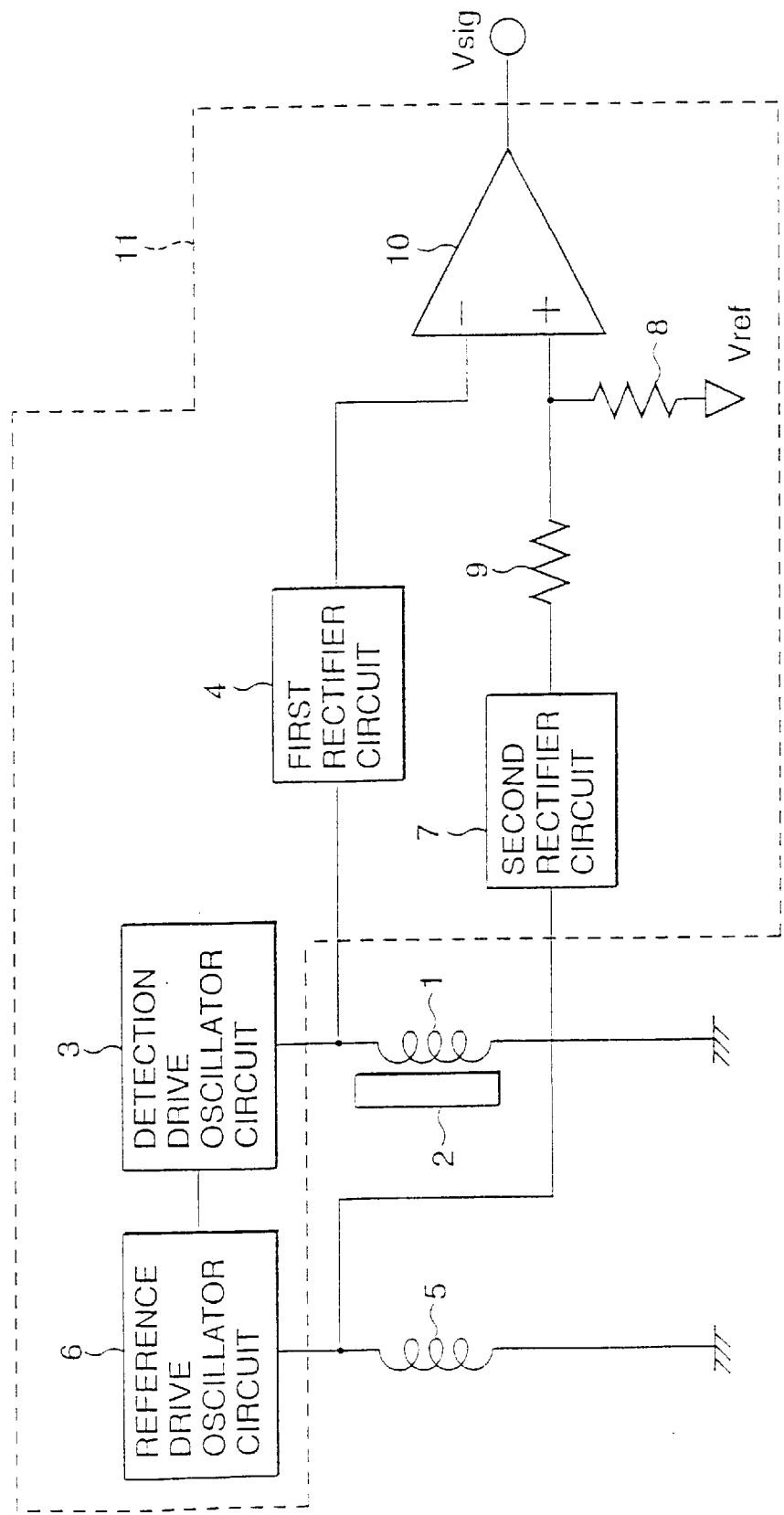
FIG. 1 is a circuit diagram illustrating a first embodiment of the present invention.
Figure 2:
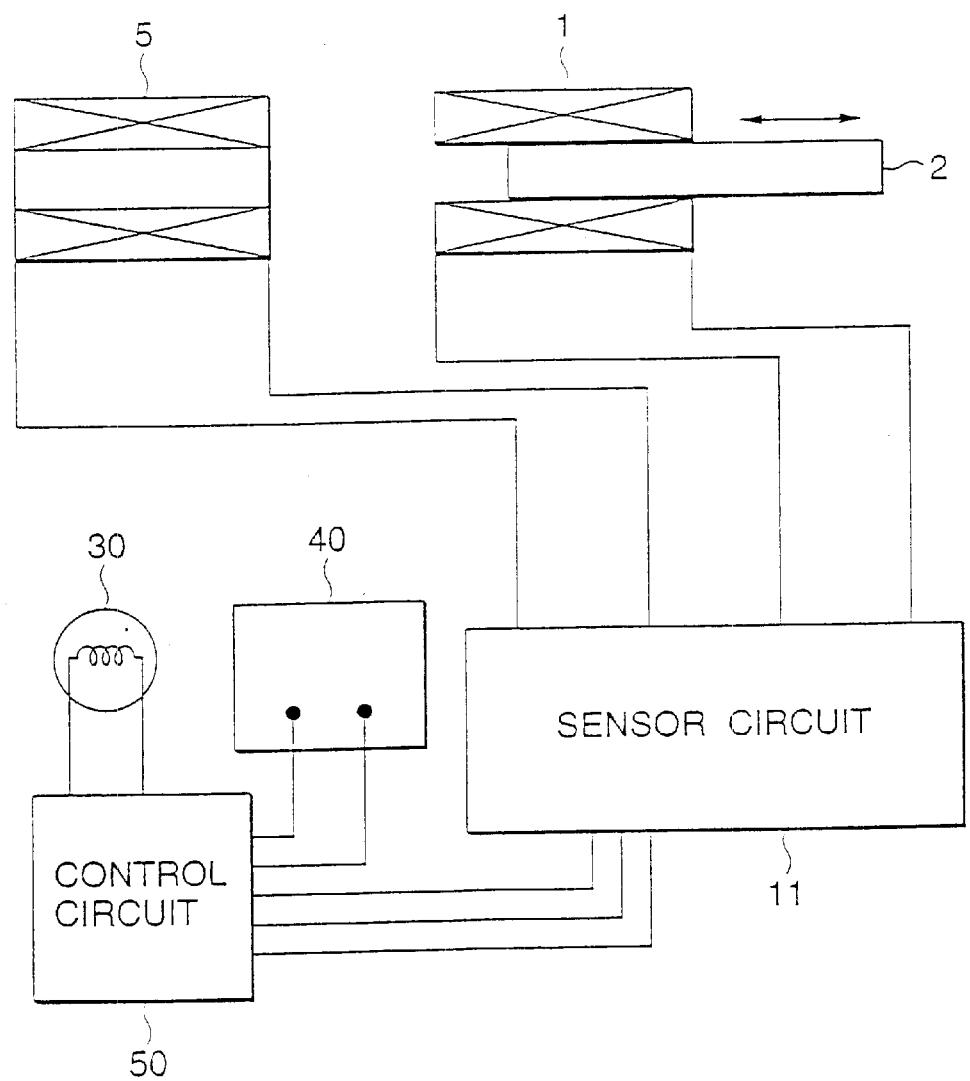
FIG. 2 is a diagram illustrating a state in which a shaft to be detected is inserted into a detection coil of the first embodiment of the present invention.

A first embodiment of the present invention is described hereinbelow with reference to FIGS. 1 to 3. This sensor is used for causing a control circuit 50 to control the lighting of a backlight 30 and an ignition lamp 40. This sensor has a detection coil 1, a shaft 2 to be detected, a detection drive oscillator circuit 3, a first rectifier circuit 4, a reference coil 5, a reference drive oscillator circuit 6, a second rectifier circuit 7, a first level shift resistor 8, a second level shift register 9, and a comparator 10.

The detection coil 1 has an end connected to the detection drive oscillator circuit 3, and also has another end that is grounded. The detection coil 1 is caused by the detection drive oscillator circuit 3 to generate a high-frequency magnetic field and output an oscillation signal. This oscillation signal is rectified by the first rectifier circuit 4 connected to an end of the detection coil 1. Further, as illustrated in FIG. 2, this detection coil 1 is adapted so that oscillation signals outputted therefrom change according to an inserted state of a metallic shaft 2 to be detected, more particularly, to a displacement dimension of the shaft 2 when the shaft 2 is inserted thereinto.

The reference coil 5 has the same specifications as those for the detection coil 1. Thus, these coils have the same inner diameter, axial dimension, and material. This reference coil 5 is disposed sufficiently away from the detection coil 10 so that no magnetic mutual interference occurs between the reference coil 5 and the detection coil 1. This reference coil 5 has an end connected to the reference drive oscillator circuit 6 and also has the other end that is grounded. The reference coil 5 is caused by the reference drive oscillator circuit 6 to generate a high-frequency magnetic field and to output an oscillation signal. This oscillation signal is rectified by the second rectifier circuit 7 connected to an end of the reference coil 5. The signal level of this rectified oscillation signal is shifted to a desired voltage level by being passed from an end of the first level shift resistor 8, the other end of which is connected to the reference voltage Vref, to the other end thereof.

The comparator 10 is a differential amplifier circuit, and has an inverting input terminal, to which an oscillation signal outputted from the detection coil 1 and then rectified is inputted, and also has a non-inverting input terminal to which an oscillation signal outputted from the reference coil 5 and then shifted in voltage level is inputted. This comparator 10 is operative to amplify the difference between both the inputted oscillation signals, and to output from an output terminal thereof a detection signal Vsig for detecting an inserted state of the shaft 2 to be detected.

Furthermore, this comparator 10 composes a sensor circuit 11, together with the detection drive oscillator circuit 3, the first rectifier circuit 4, the reference drive oscillator circuit 6, the second rectifier circuit 7, the first level shift resister 8, and the second level shift resister 9.

Figure 3A:
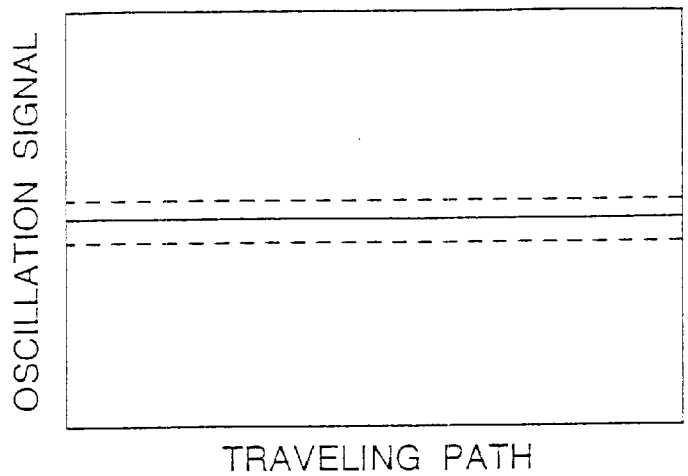
FIG. 3 is a diagram illustrating a detection signal outputted from the detection coil of the first embodiment of the present invention.
Figure 3B:
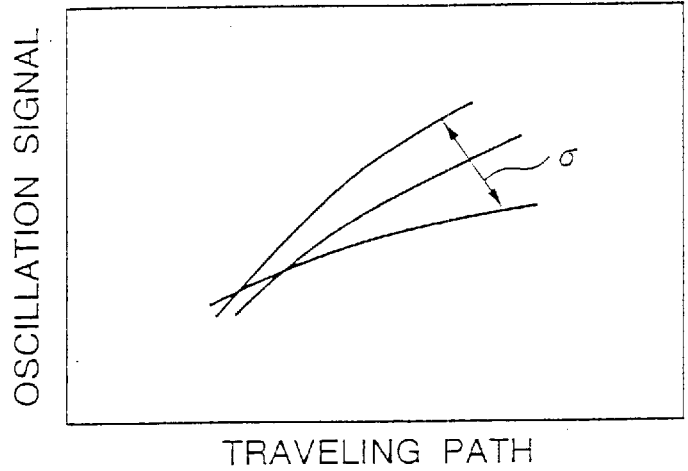
Figure 3C:
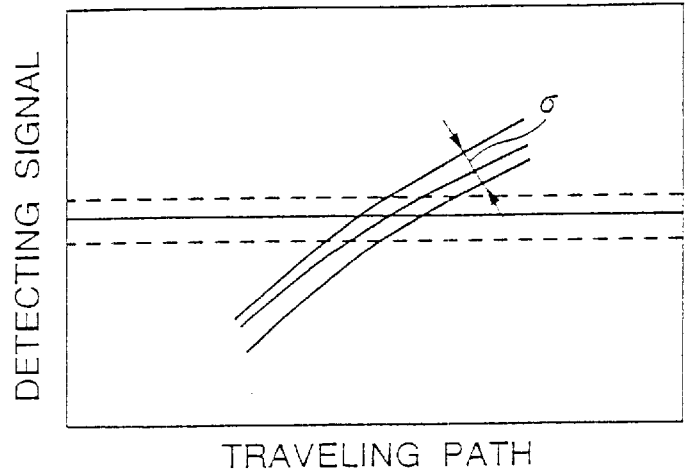

Next, an operation of the comparator 10 is described hereunder in detail with reference to (a) to (c) of FIG. 3. As indicated by a solid line in (a) of FIG. 3, an oscillation signal outputted from the reference coil 5 is inputted to the non-inverting input terminal of the comparator 10. Moreover, as indicated by a solid line in (b) of FIG. 3, an oscillation signal outputted from the detection coil 1 is inputted to the inverting input terminal of the comparator 10 according to the displacement dimension of the shaft 2 to be detected.

Furthermore, as indicated by a solid line in (c) of FIG. 3, the comparator 10 outputs a detection signal Vsig, which is obtained by amplifying the difference between both the oscillation signals. Incidentally, dashed lines shown in (a) and (c) of FIG. 3 indicate ranges of variation in the level.

Figure 4:
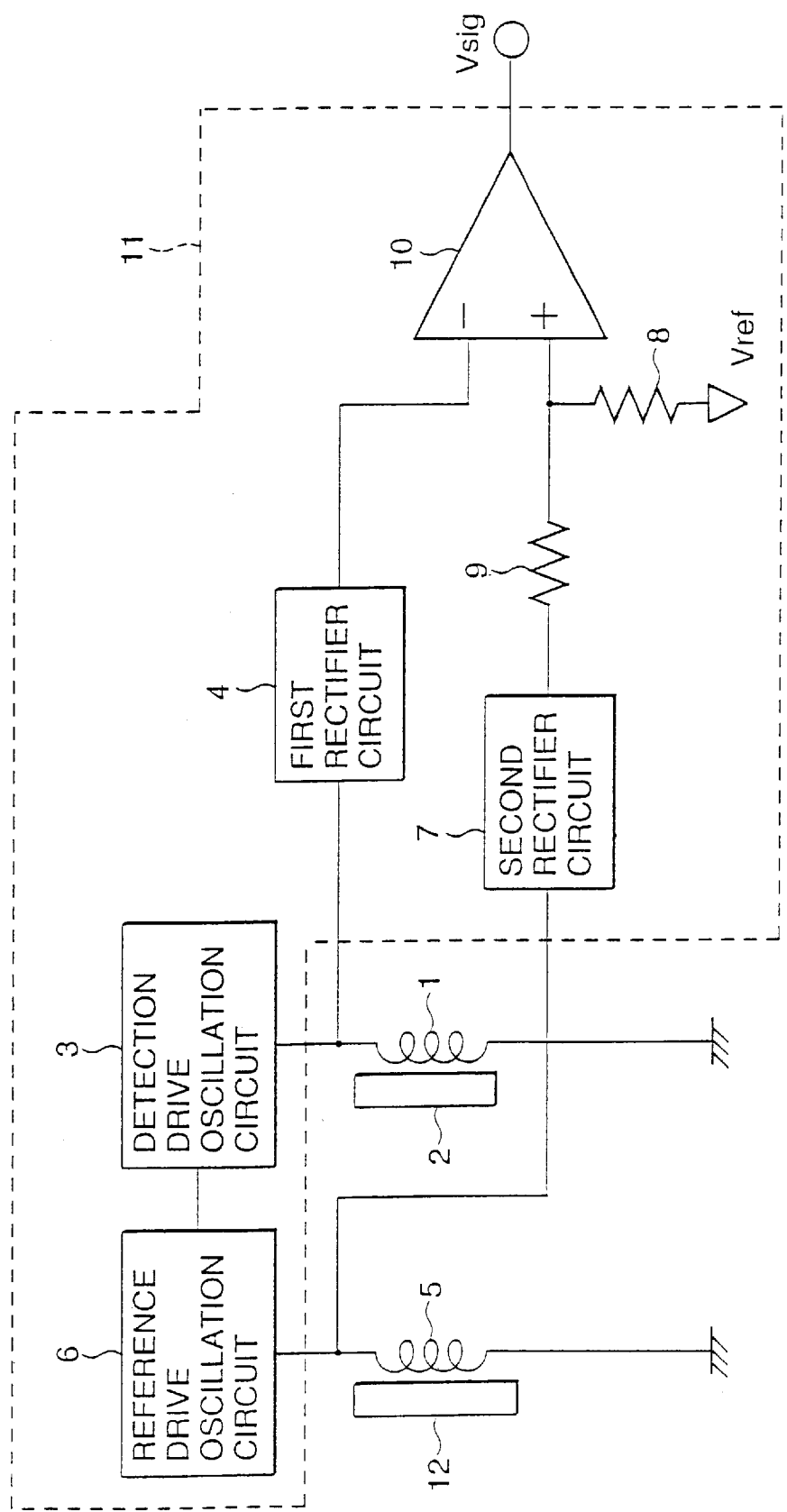
FIG. 4 is a circuit diagram illustrating a second embodiment of the present invention.
Figure 5:
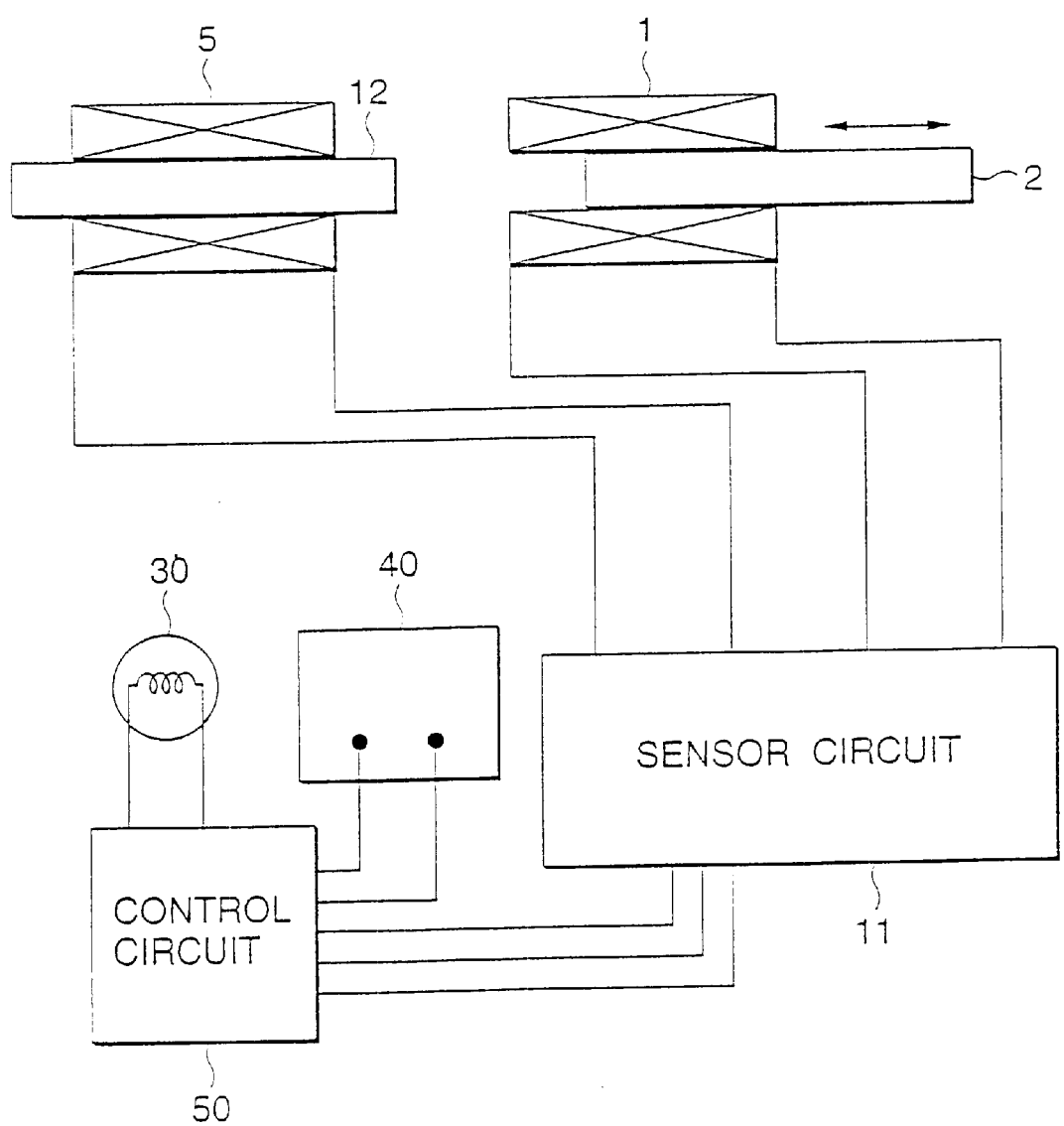
FIG. 5 is a diagram illustrating a state in which a shaft to be detected is inserted into a detection coil of the second embodiment of the present invention.

In the case of such a sensor, even when the characteristics of the detection coil 1 itself vary with temperature, the variation in the characteristics of the coil itself is canceled by obtaining the difference between the oscillation signals respectively outputted from the detection coil 1 and the reference coil 5, according to the inserted state of the shaft 2 to be detected. Thus, the variation σ in the level of the detection signal Vsig, which is shown in (c) of FIG. 3, is small, as compared with the variation σ in the level of the oscillation signal, which is shown in (b) of FIG. 3. Thus, the position of the shaft 2 to be detected can be accurately detected. traveli Second Embodiment Next, a second embodiment of the present invention is described hereinbelow with reference to FIGS. 4 to 6. Incidentally, in this figure, portions having substantially the same function as that of a corresponding portion of the first embodiment are designated by like reference characters. Only the differences between the second and first embodiments are described herein. Basically, the second embodiment is similar in configuration to the first embodiment. However, the second embodiment is adapted so that a reference shaft 12 having the same specifications as those for the shaft 2 to be detected is inserted into the reference coil 5.

More specifically, the reference shaft 12 is formed so that the relative positional relation between the reference shaft 12 and the reference coil 5 is fixed, and that the reference shaft 12 is sufficiently larger than the reference coil 5 in such a manner as to be completely detected by the reference coil 5.

Figure 6A:
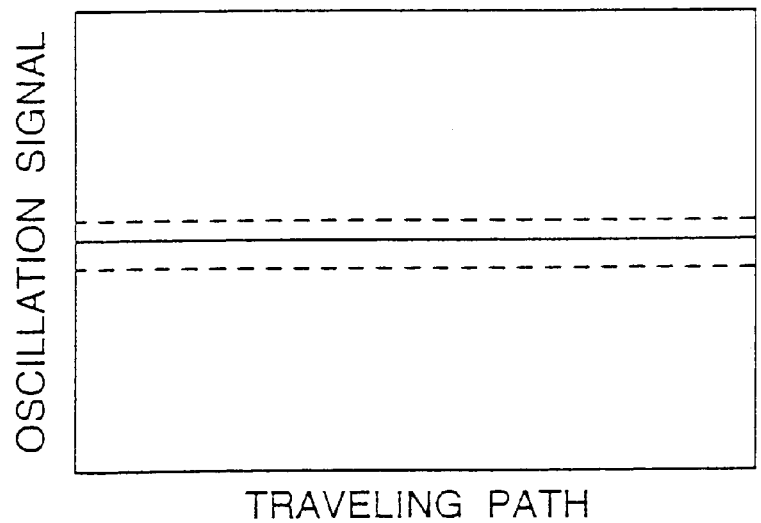
FIG. 6 is a diagram illustrating a detection signal outputted from the detection coil of the second embodiment.
Figure 6B:
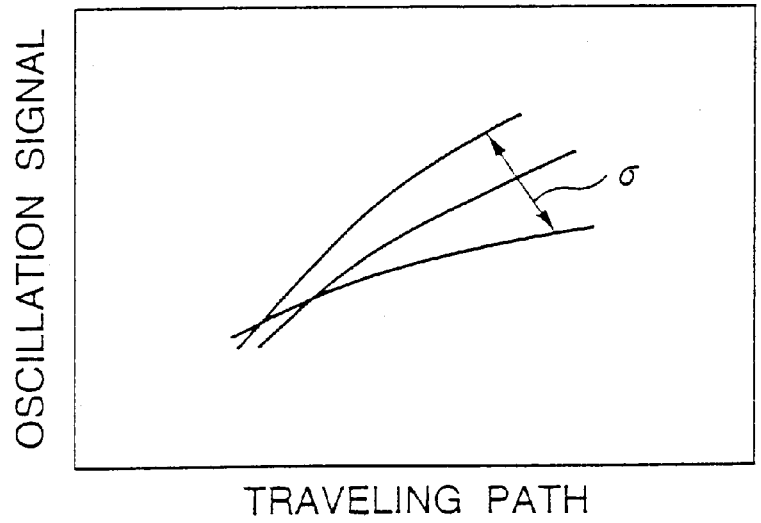
Figure 6C:
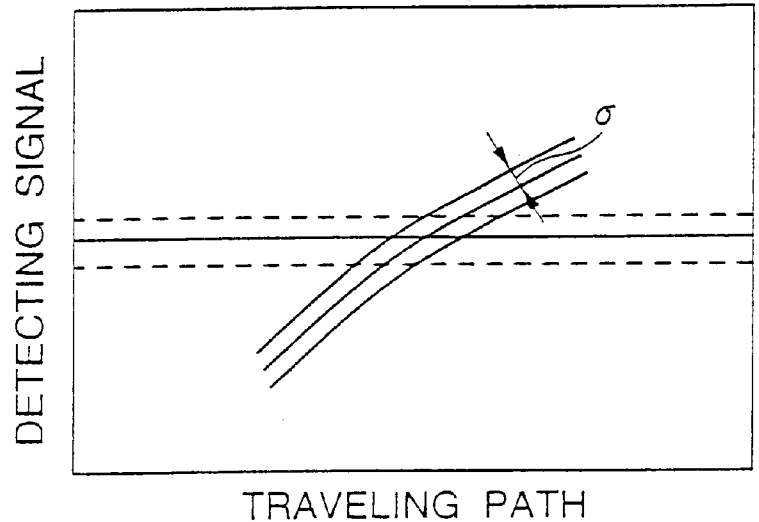

Next, an operation of the comparator 10 is described hereunder in detail with reference to (a) to (c) of FIG. 6. As indicated by a soild line in (a) of FIG. 6, an oscillation signal outputted from the reference coil 5 is inputted to the non-inverting input terminal of the comparator 10. As indicated by a solid line in (b) of FIG. 6, an oscillation signal outputted from the detection coil 1 is inputted to the inverting input terminal of the comparator 10 according to the displacement dimension of the shaft 2 to be detected. The comparator 10 outputs a detection signal Vsig, which is obtained by amplifying the difference between both the oscillation signals, as indicated by a solid line in (c) of FIG. 6. Incidentally, dashed lines shown in (a) and (c) of FIG. 6 indicate ranges of variation in the level.

In the case of such a sensor, a reference shaft 12 having the same specifications as those for the shaft 2 to be detected is inserted into the reference coil 5. Thus, even when the values of the physical properties, such as the magnetic permeability and dimensions of the shaft 2 itself vary with temperature, the variation in the characteristics of the shaft 2 itself is canceled by obtaining the difference between the oscillation signals respectively outputted from the detection coil 1 and the reference coil 5, according to the inserted state of the shaft 2 to be detected. Therefore, the variation σ in the level of the detection signal Vsig, which is shown in (c) of FIG. 6, is small, as compared with the variation σ in the level of the oscillation signal, which is shown in (a) of FIG. 6. Consequently, the second embodiment can enhance the effect of the first embodiment, which resides in that the position of the shaft 2 to be detected can be accurately detected.

Third Embodiment

Figure 7:
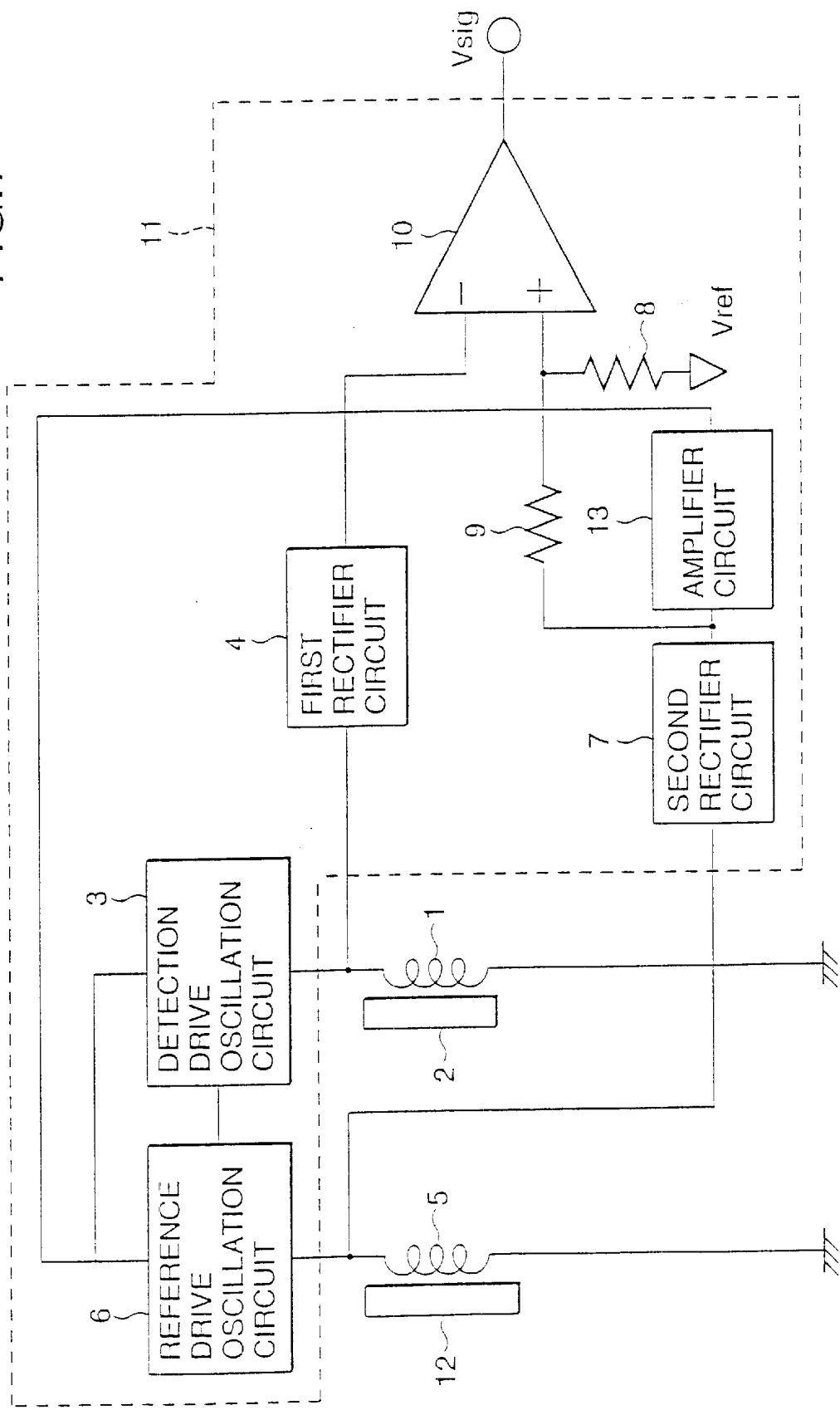
FIG. 7 is a circuit diagram illustrating a third embodiment of the present invention.

Next, a third embodiment of the present invention is described hereinbelow with reference to FIGS. 7 and 8. Incidentally, in this figure, portions having substantially the same function as that of a corresponding portion of the second embodiment are designated by like reference characters. Only the differences between the second and third embodiments are described herein. Basically, the third embodiment is similar in configuration to the second embodiment. However, the third embodiment is configured so that a reference drive oscillator circuit 3 and a reference drive oscillator circuit 6 generate high-frequency magnetic fields according to oscillation signals outputted from the reference coil 5.

More specifically, a second rectifier circuit 7 is connected through an amplifier circuit 13 to each of the detection drive oscillator circuit 3 and the reference drive oscillator circuit 6. A rectified oscillation signal outputted from the second rectifier circuit 7 is fed back to each of the detection drive oscillator circuit 3 and the reference drive oscillator circuit 6. The detection drive oscillator circuit 3 causes the detection coil 1 according to this fed back oscillation signal to generate a high-frequency magnetic field. Moreover, the reference drive oscillator circuit 6 causes the reference coil 1 to generate a high-frequency magnetic field.

Figure 8A:
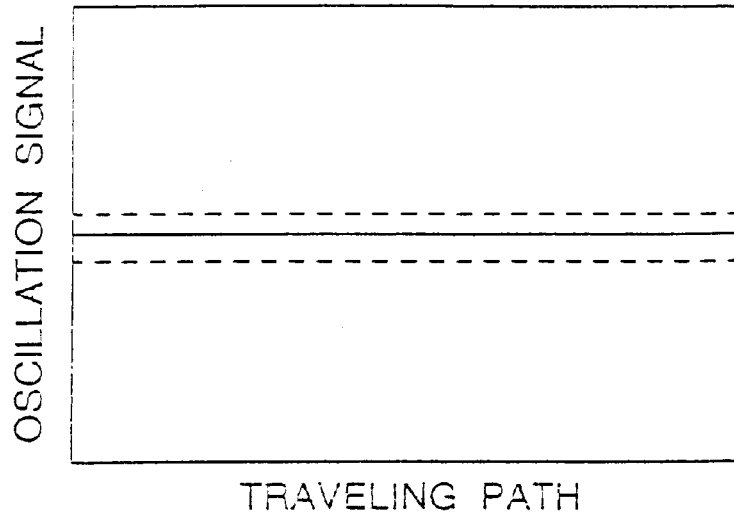
FIG. 8 is a diagram illustrating a detection signal outputted from the detection coil of the third embodiment.
Figure 8B:
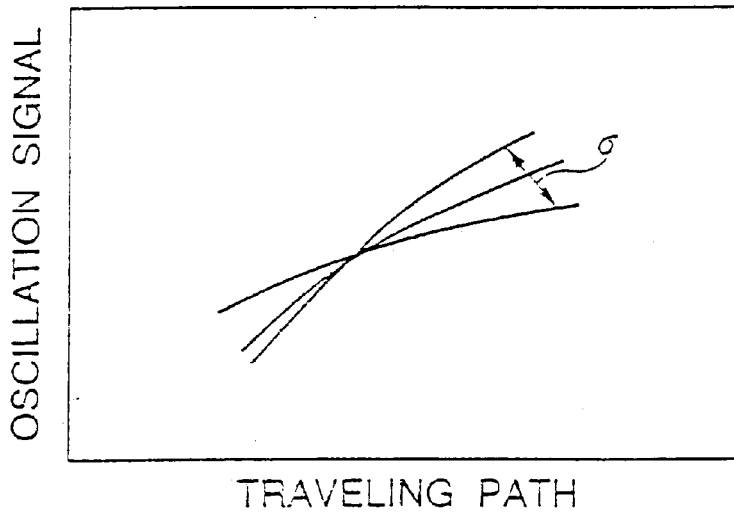
Figure 8C:
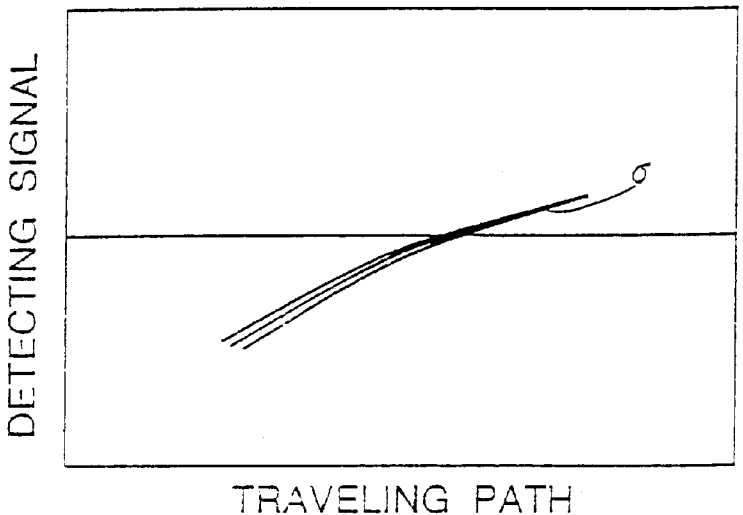

Next, an operation of the comparator 10 is described hereunder in detail with reference to (a) to (c) of FIG. 8. As indicated by a solid line in (a) of FIG. 8, an oscillation signal outputted from the reference coil 5 is inputted to the non-inverting input terminal of the comparator 10. As indicated by a solid line in (b) of FIG. 8, an oscillation signal outputted from the detection coil 1 is inputted to the inverting input terminal of the comparator 10 according to the displacement dimension of the shaft 2 to be detected. The comparator 10 outputs a detection signal Vsig, which is obtained by amplifying the difference between both the oscillation signals, as indicated by a solid line in (c) of FIG. 8. Incidentally, a dashed line shown in (a) and (c) of FIG. 8 indicates a range of variation in the level.

In the case of such a sensor, each of the detection drive oscillator circuit 3 and the reference drive oscillator circuit 6 causes the coil to generate a high-frequency magnetic field according to an oscillation signal that changes in accordance with variation in a state, in which a high-frequency magnetic field is generated. This reduces the variation in a state, in which the detection drive oscillator circuit 3 and the reference drive oscillator circuit 6 cause the coils to generate high-frequency magnetic fields. The variation in the level of the detection signal Vsig illustrated in (c) of FIG. 8 is low, as compared with that of the level of the oscillation signal, which is illustrated in (a) of FIG. 8. Consequently, the third embodiment can enhance the effect of the first embodiment, which resides in that the position of the detection shaft 2 to be detected can be accurately detected.

Fourth Embodiment

Figure 9:
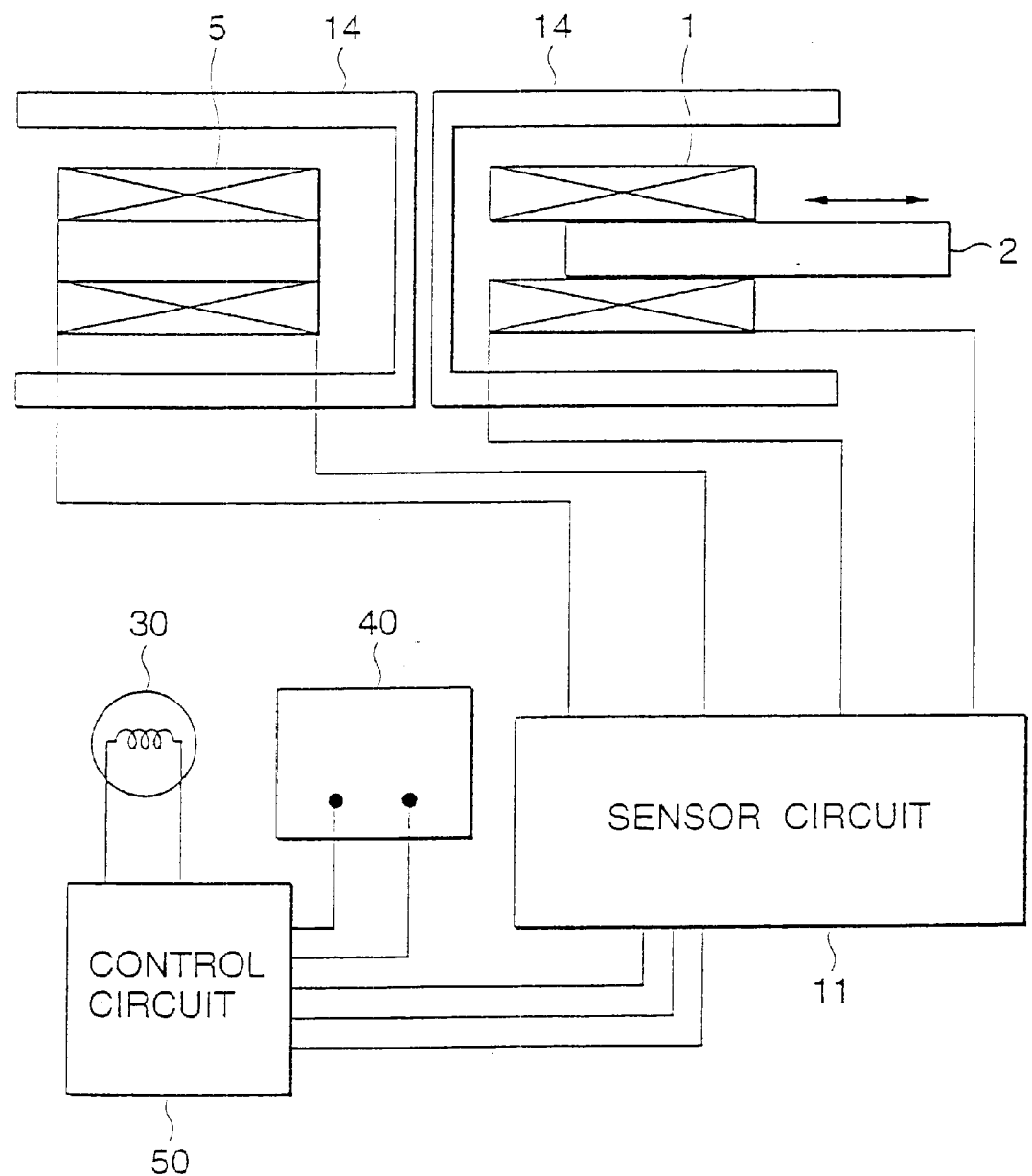
FIG. 9 is a diagram illustrating a state in which a shaft to be detected is inserted into a detection coil of a fourth embodiment of the present invention.

Next, a fourth embodiment of the present invention is described hereinbelow with reference to FIG. 9. Incidentally, in this figure, portions having substantially the same function as that of a corresponding portion of the first embodiment are designated by like reference characters. Basically, the fourth embodiment is similar in configuration to the first embodiment. However, similarly as the third embodiment, the fourth embodiment is configured so that the reference drive oscillator circuit 3 and the reference drive oscillator circuit 6 generate high-frequency magnetic fields according to oscillation signals outputted from the reference coil 5, and that moreover, shield members 14 each for providing magnetic shielding between the detection coil 1 and the reference coil 5 are provided therein.

More particularly, each of the shield members 14 is formed like a bottomed cylinder. The shield member 14 for covering the detection coil 1, and the shield member 14 for covering the reference coil are disposed in a state, in which the bottom surfaces of the shield members 14 face each other, so that the shield members 14 provide magnetic shielding between the detection coil 1 and the reference coil 5.

In the case of such a sensor, an occurrence of the magnetic mutual interference between the detection coil 1 and the reference coil 5 is prevented by the shield members 14 for providing magnetic shielding therebetween. Thus, both the oscillation signals are accurately outputted. Consequently, the fourth embodiment can enhance the effect of the first embodiment, which resides in that the position of the shaft 2 to be detected is accurately detected.

Moreover, this eliminates the necessity for placing the detection coil 1 in such a way as to be sufficiently away from the reference coil 5 to prevent an occurrence of magnetic mutual interference therebetween. Consequently, the sensor can be miniaturized.

Incidentally, in addition to the case of the configuration of the fourth embodiment, even in the case of another configuration thereof, in which the reference shaft 12 having the same specifications as those for the shaft 2 to be detected is inserted into the reference coil 5, similarly as in the case of the second embodiment, an occurrence of the magnetic mutual interference between the detection coil 1 and the reference coil 5 is prevented by providing the magnetic shielding therebetween. Thus, both the oscillation signals are accurately outputted. Consequently, the fourth embodiment can enhance the effect of the first embodiment, which resides in that the shaft 2 to be detected is accurately detected.

Fifth Embodiment

Figure 10:
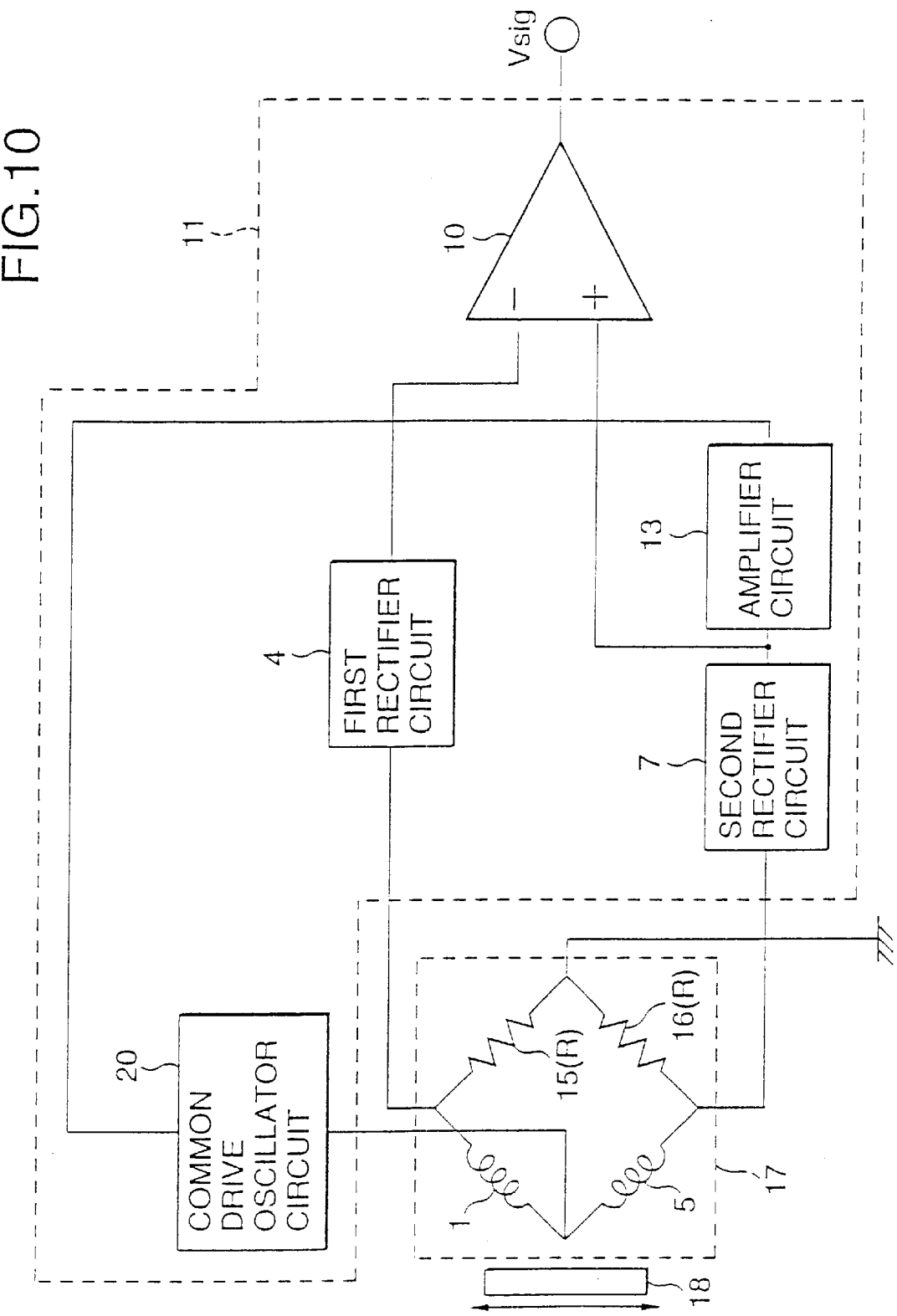
FIG. 10 is a circuit diagram illustrating a fifth embodiment of the present invention.

Next, a fifth embodiment of the present invention is described hereinbelow with reference to FIGS. 10 to 12. Incidentally, in this figure, portions having substantially the same function as that of a corresponding portion of the third embodiment are designated by like reference characters. Only the differences between the fifth and third embodiments are described herein. In the case of the third embodiment, the detection coil 1 ha an end connected to the reference drive oscillator circuit 6, and also has the other end that is grounded. In contrast, in the case of the fifth embodiment, an end of the detection coil 1 is series-connected to an end of the reference coil 5. A common drive oscillator circuit 20 is connected to the connection point between the coils 1 and 5. Moreover, the coils 1 and 5 compose a bridge circuit 17 together with a first bridge element 15 and a second bridge element 16. A connection point between these elements, which is one of opposite connection points of one set and provided opposite to the connection point between the detection coil 1 and the reference coil 5, is grounded.

More particularly, a metallic common shaft 18 is inserted into the detection coil 1 and the reference coil 5. A total of the dimension of a part, which is inserted in the coil 1, of this common shaft 18 and the dimension of another part, which is inserted in the coil 5, thereof is a predetermined dimension. Further, this common shaft 18 is driven by the shaft 2 connected thereto through a resin connecting member 19 along a direction, in which the shaft 18 is inserted in the detection coil 1 and the reference coil 5, and along the direction indicated by arrows in FIG. 11. In this embodiment, it is applicable for forming the shaft 2 by resin or like instead of metal.

The bridge circuit 17 is adapted so that the common drive oscillator circuit 20, which is connected to the connection point between the detection coil 1 and the reference coil 5, causes the detection coil 1 and the reference coil 5 to generate a high-frequency magnetic field. An oscillation signal is outputted from one of opposite connection points, which is the other end of the detection coil 1, of the other set. Moreover, an oscillation signal is outputted from the other of opposite connection points, which is the other end of the reference coil 5, of the other set.

The first bridge element 15 comprises a resistor R constituted by a chip component. Further, the second bridge 16 comprises a resistor R constituted by a chip component, which is similar to the chip component constituting the first bridge element 15.

Further, a rectified oscillation signal outputted from the second rectifier circuit is fed back to the common drive oscillator circuit 20. According to this fed back oscillation signal, the common drive oscillator circuit 20 causes the detection coil 1 and the reference coil 5 to generate high frequency magnetic fields.

Further, no means equivalent to the first level shift resistor 8 and the second level shift resistor 9 of the third embodiment are provided in the fifth embodiment.

Figure 12A:
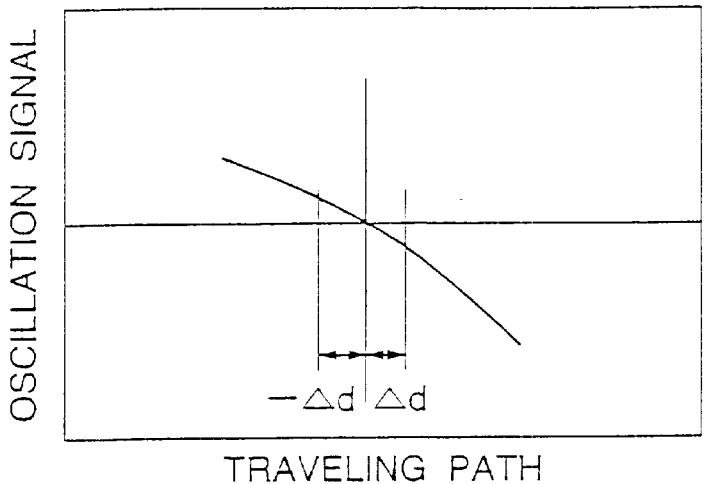
FIG. 12 is a diagram illustrating a detection signal outputted from the detection coil of the fifth embodiment of the present invention.
Figure 12B:
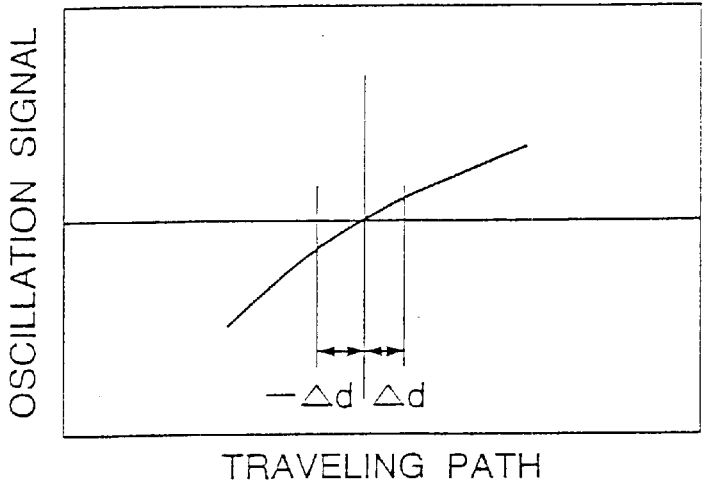
Figure 12C:
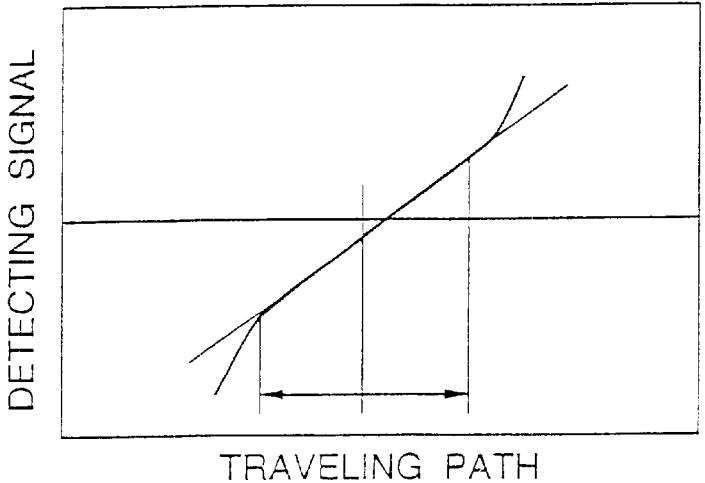

Next, an operation of the comparator 10 is described hereunder with reference to (a) to (c) of FIG. 12. As illustrated in (a) of FIG. 12, an oscillating signal is inputted to the non-inverting input terminal of the comparator 10 from one of the opposite connection points, which is the other end of the detection coil 1, according to the displacement dimension of the common shaft 18 driven by the shaft 2 to be detected. Moreover, as illustrated in (b) of FIG. 12, an oscillation signal is inputted to the inverting input terminal of the comparator 10 from the other of the opposite connection points, which is the other end of the reference coil 6, of the other set. Furthermore, as illustrated in (c) of FIG. 12, a detection signal Vsig obtained by amplifying the difference between both the oscillation signals is outputted from the output terminal of the comparator 10.

In the case of such a sensor, even when the characteristics of the detection coil 1 itself vary with temperature, the variation in the characteristics of the coil itself is canceled by obtaining the difference between the oscillation signals respectively outputted from the detection coil 1 and the reference coil 5, according to the inserted state of the common shaft 18 driven by the shaft 2 to be detected. Thus, the variation in the level of the detection signal Vsig, which is shown in (c) of FIG. 12, is small, as compared with the variation in the level of the oscillation signal, which is shown in (a) of FIG. 12. Thus, the position of the common shaft 18 can be accurately detected. Consequently, the position of the shaft 2 disposed in such a way as to be able to drive the common shaft 18 in a direction, in which the common shaft 18 is inserted in the detection coil 1 and the reference coil 5, can be accurately detected.

Further, the common shaft 18 is inserted into the detection coil 1 and the reference coil 5 so that a total of the dimension of a part thereof, which is inserted into the detection coil 1, and the dimension of another part thereof, which is inserted into the reference coil 5, is a predetermined dimension. Thus, as the dimension $\Delta d$ of a part of the common shaft 18, which is inserted into one of the detection coil 1 and the reference coil 5, increases, the dimension $\Delta d$ of another part of the common shaft 18, which is inserted into the other of the detection coil 1 and the reference coil 5, decreases.

Therefore, the oscillation signals are symmetric signals that are equal in the absolute value of the amplitude thereof but different in the sign thereof, namely, have positive and negative signs, respectively. Consequently, noise components, whose magnitudes are considered as being almost equal to each other, are canceled by obtaining the difference between such symmetrical signals. Hence, the fifth embodiment can enhance the effect that the position of the common shaft 18 is accurately detected.

Moreover, as illustrated in (c) of FIG. 12, there are two places, at which the level of the detection signal Vsig linearly changes according to a displacement dimension of the common shaft 18, at both sides of the center between the detection coil 1 and the reference coil 5 when obtaining the difference between both the oscillation signals, which are symmetrical signals. Thus, the fifth embodiment can enhance the effect that the position of the shaft 2 can be accurately detected.

Furthermore, the common drive oscillator circuit 20 causes the coils to generate a high-frequency magnetic field according to an oscillation signal adapted to change in accordance with variation in a state, in which a high-frequency magnetic field is generated by the coils that are caused by the common drive oscillator circuit 20. Thus, the variation in the state, in which the common drive oscillator circuit 20 causes a high-frequency magnetic field, is reduced. Consequently, the fifth embodiment can enhance the effect that the position of the shaft 2 to be detected can be accurately detected.

Incidentally, although both the first bridge element 15 and the second bridge element 16 are chip components in the case of the fifth embodiment, similar effects can be obtained even in the case that these elements are not chip moments.

Sixth Embodiment

Figure 13:
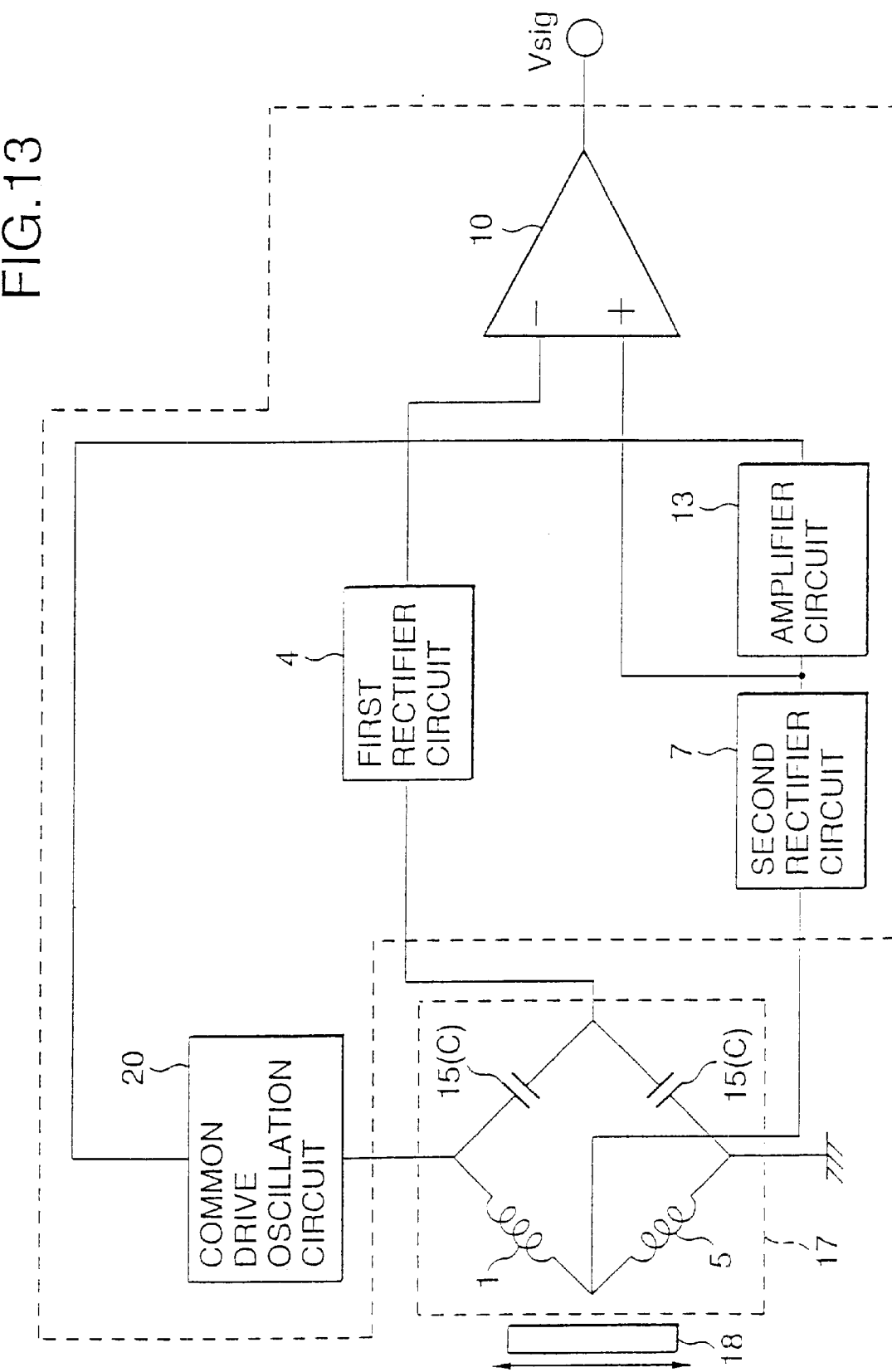
FIG. 13 is a circuit diagram illustrating a sixth embodiment of the present invention.
Figure 14:
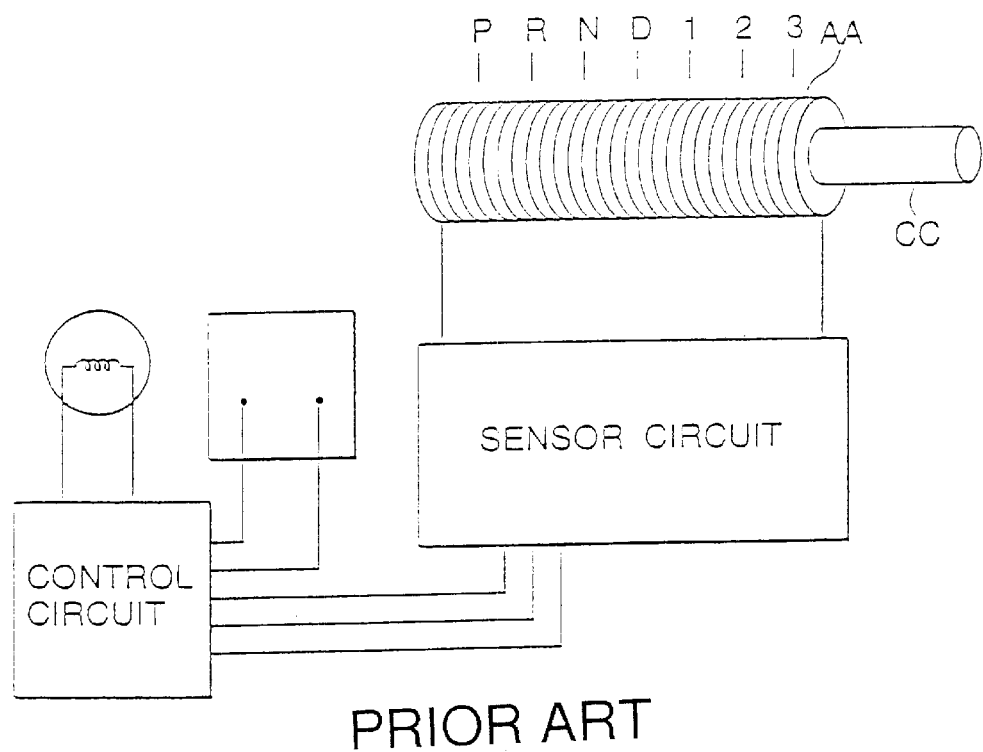
FIG. 14 is a diagram illustrating a state in which a shaft is inserted into a coil of a conventional sensor.
Figure 15:
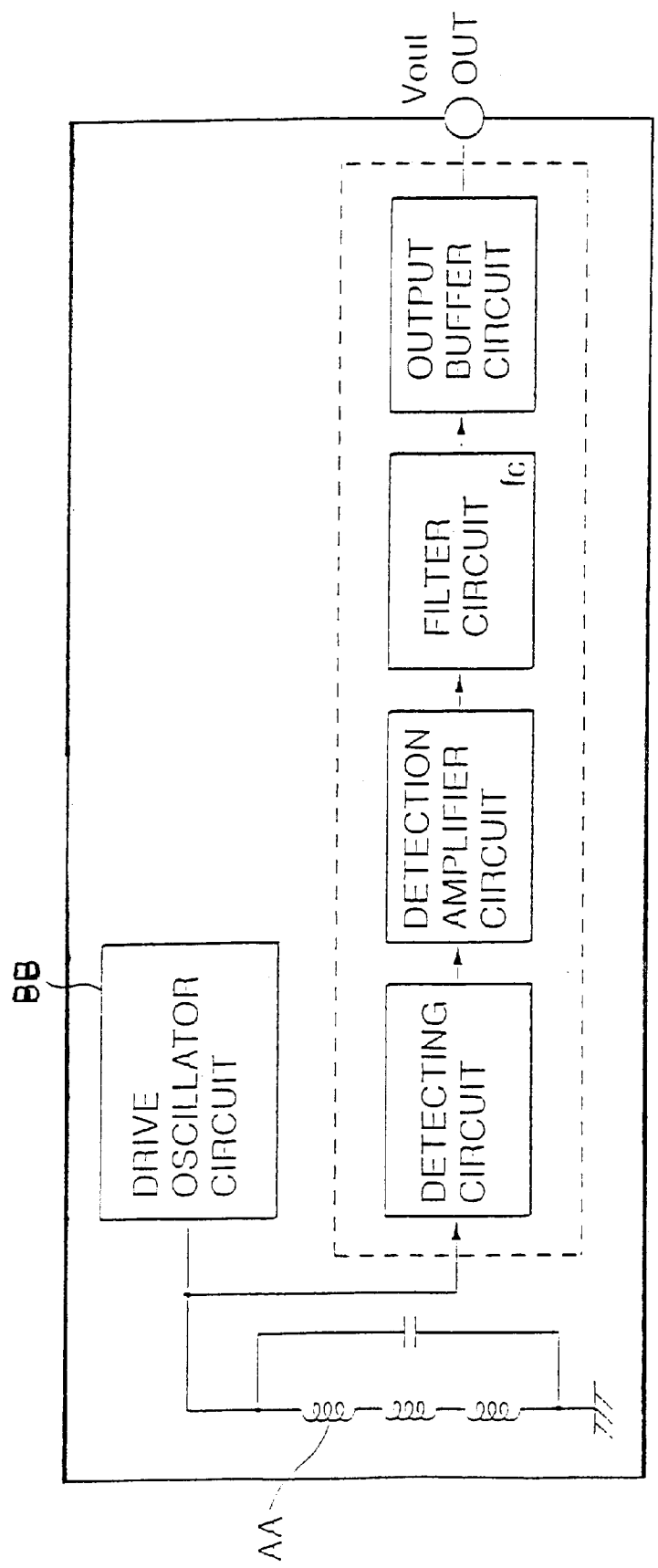
FIG. 15 is a circuit diagram illustrating the conventional sensor.
Figure 16:
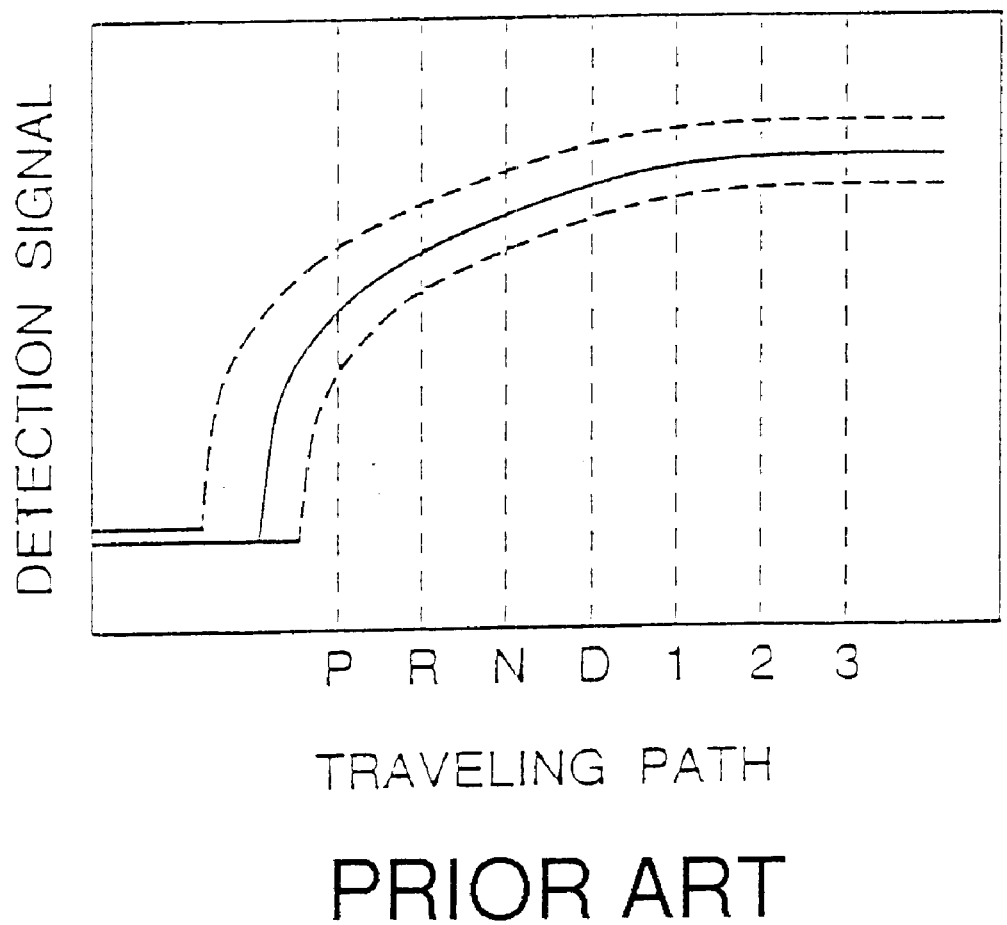
FIG. 16 is a diagram illustrating a detection signal outputted from the coil of the conventional sensor.

Next, a sixth embodiment of the present invention is described hereinbelow with reference to FIG. 13. Incidentally, in this figure, portions having substantially the same function as that of a corresponding portion of the fifth embodiment are designated by like reference characters. Only the differences between the sixth and fifth embodiments are described herein. Although the first bridge element 15 and the second bridge element 16 of the fifth embodiment are resistors R constituted by chip components, these bridge elements of the sixth embodiment are capacitors C constituted by chip components.

Such a sensor according to this embodiment has the following effect in addition to the effects of the fifth embodiment. The capacitors C constituted by chip components contain no lead, differently from the resistors R constituted by chip components. Thus, lead is not dissolved by being heated when the chip components are soldered. Consequently, the reliability in the soldering is not impaired by the dissolved lead.

Incidentally, although the shaft 2 to be detected is metallic in each of the fifth and sixth embodiments, the material of the shaft 2 is not limited to a metallic material. A resin material may be employed as the material of the shaft 2.

Seventh Embodiment

Figure 17:
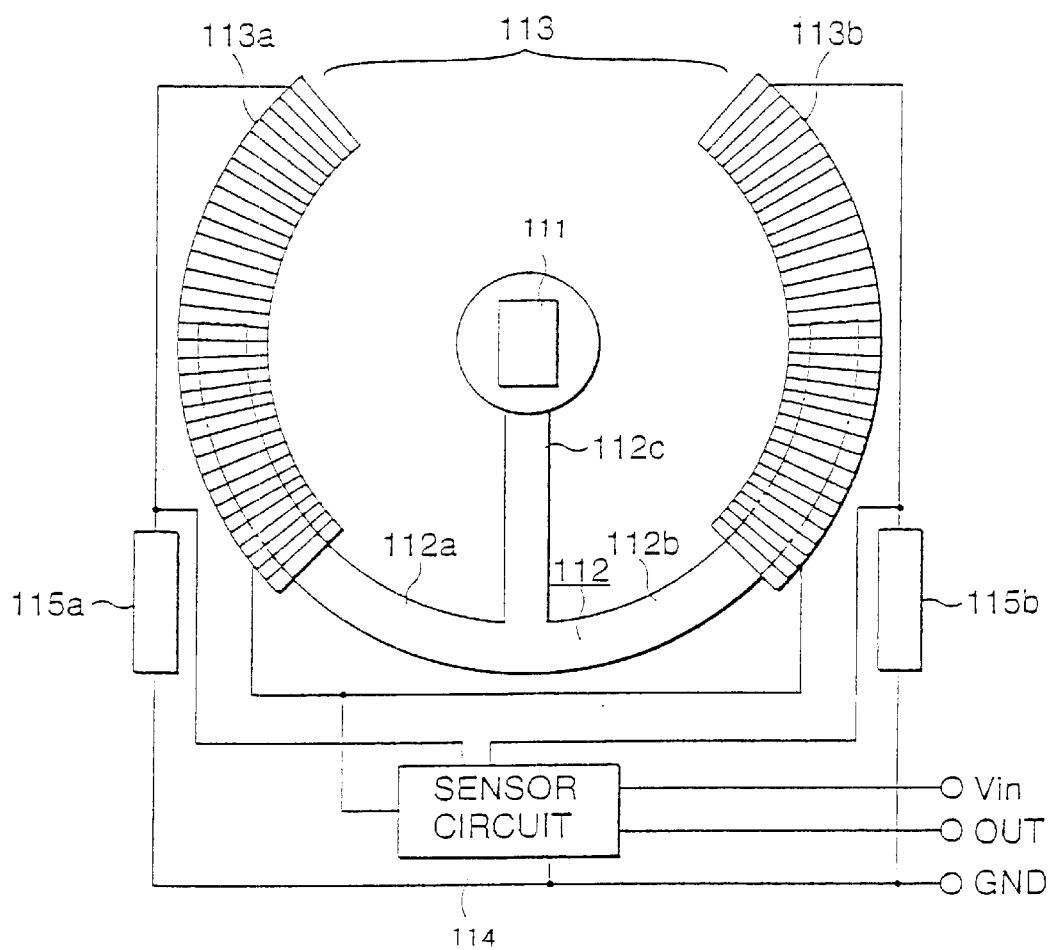
FIG. 17 is a schematic illustrating a seventh embodiment of the present invention.

In following embodiments, the present invention is applied to a rotation type magnetic sensor. FIG. 17 shows a schematic view of a seventh embodiment of the present invention. There is provided a rotating shaft 111 rotating interlockingly with an automatic transmission; a movable metal member 112 rotating about the rotating shaft 111, which is made from magnetic material and is arc-shaped, the movable metal member 112 having arm portions 112a and 112b extending from the middle point of the movable metal member 112; a sensor coil portion having sensor coils 113a and 113b into which the arm portions 112a and 112b are respectively inserted; a sensor circuit 114 and resisters 115a and 115b detecting a coil current flowing to each of sensor coils 113a and 113b.

As shown in FIG. 17, the movable metal member 112 is arc-shaped and has a length such as half of the circumference of the circle corresponding to the arc-shape, and a connecting rib 112c extends from a middle portion of the movable metal member 112 toward the rotating shaft 111 along the diameter direction. The connecting rib 112c is connected to the rotating shaft 111 arranged on the center of the circle and rotates interlockingly with the rotation of the rotating shaft 111.

Of course, it is capable of uniformly forming the movable metal member 112 and the connecting rib 112c of the same metal. On the other hand, the connecting rib 112c, connecting the rotating shaft 111 and the movable metal member 112, may be made of resin, and the arm portions 112a and 112b, which are respectively inserted into the sensor coils 113a and 113b, may be only of magnetic material.

The sensor coils 113a and 113b are bent in an arc shape in order to follow a center axis of the sensor coils 113a and 113b on a trajectory of the rotational movement of the movable metal member 112. The wire is uniformly wound on each coil. Each sensor coil 113a or 113b has a coil length corresponding to one-fourth of the circumference of the circle drawn by the center axis thereof, and the sensor coils 113a and 113b are symmetrically arranged with respect to a diameter passing through the rotating shaft 111.

Upon a structure described above, this construction is applied to a condition that the rotation shaft rotates within the rotation angle of ±45°. In order to obtain the differential effect achieved by the sensor coils 113a and 113b, the following condition is subjected. A condition as shown in FIG. 17 is considered as a center condition such that the rotation angle corresponds to center (0°). Under this circumstance, each tip end of arm portions 112a and 112b is inserted until the center portion of each the sensor coils 113a and 113b, respectively. When the rotating shaft 111 rotates at 45° on right side or left side in FIG. 17, one arm portion 112a or 112b of the movable metal member 112 is completely inserted into the sensor coil 113a or 113b so that the tip end portion of the other arm portion 112a or 112b moves at a position as an entrance of the sensor coil 113a or 113b.

An operation principle will be described hereinbelow.

Primary, the arm portion 112a and 112b of the movable metal member 112 are inserted into the sensor coils 113a and 113b, respectively so that each magnetic resistance thereof is changed in response to an occupation amount of magnetic circuit by the insertion the arm portion 112a and 112b into the sensor coil 113a and 113b, respectively. A high frequency magnetic flex, which is generated by the sensor coils 113a and 113b excited by the sensor circuit 114, is concentrated toward the axis direction in the sensor coils 113a and 113b. The following equation expresses Magnetic field strength $H_x$ on a line extending from the center axis of sensor coils 113a and 113b.

$$H_x = NI/2l \times \{X/(a^2+x^2)^{1/2}(l-X)/[a^2+(l-X)^2]^{1/2}\} \quad (1)$$

where, X: a distance defined from a middle point on the center axis; a: a diameter of the sensor coil 113a and 113b; l: a sensor coil length; N: winding and I: current.

In the case where the length l of the sensor coil 113a and 113b is larger than coil a (l>>a).

Magnetic field strength $H_0$ at a center portion (X=0) of sensor coil 113a and 113b is expressed:

$$H_0 = NI/l \quad (2)$$

Thus, a magnetic field strength $H_{1/2}$ at a sensor end portion (X=½) is expressed:

$$H_{1/2} = \tfrac{1}{2} NI/l \quad (3)$$

At this time, Hx is approximate to $H_0$ in the sensor coils 113a and 113b having a coil length l which is sufficiently longer than the coil diameter a.

Thus, the movable metal member 112 is constructed in the described above, that is, the amount of occupation is increased and/or decreased on the axis of the sensor coil 113a and 113b. Upon this construction, it is possible to obtain the magnetic resistance fluctuation in the magnetic strength of relatively small non-linear manner (within the range having a value could approximate to $H_0$).

Figure 18:
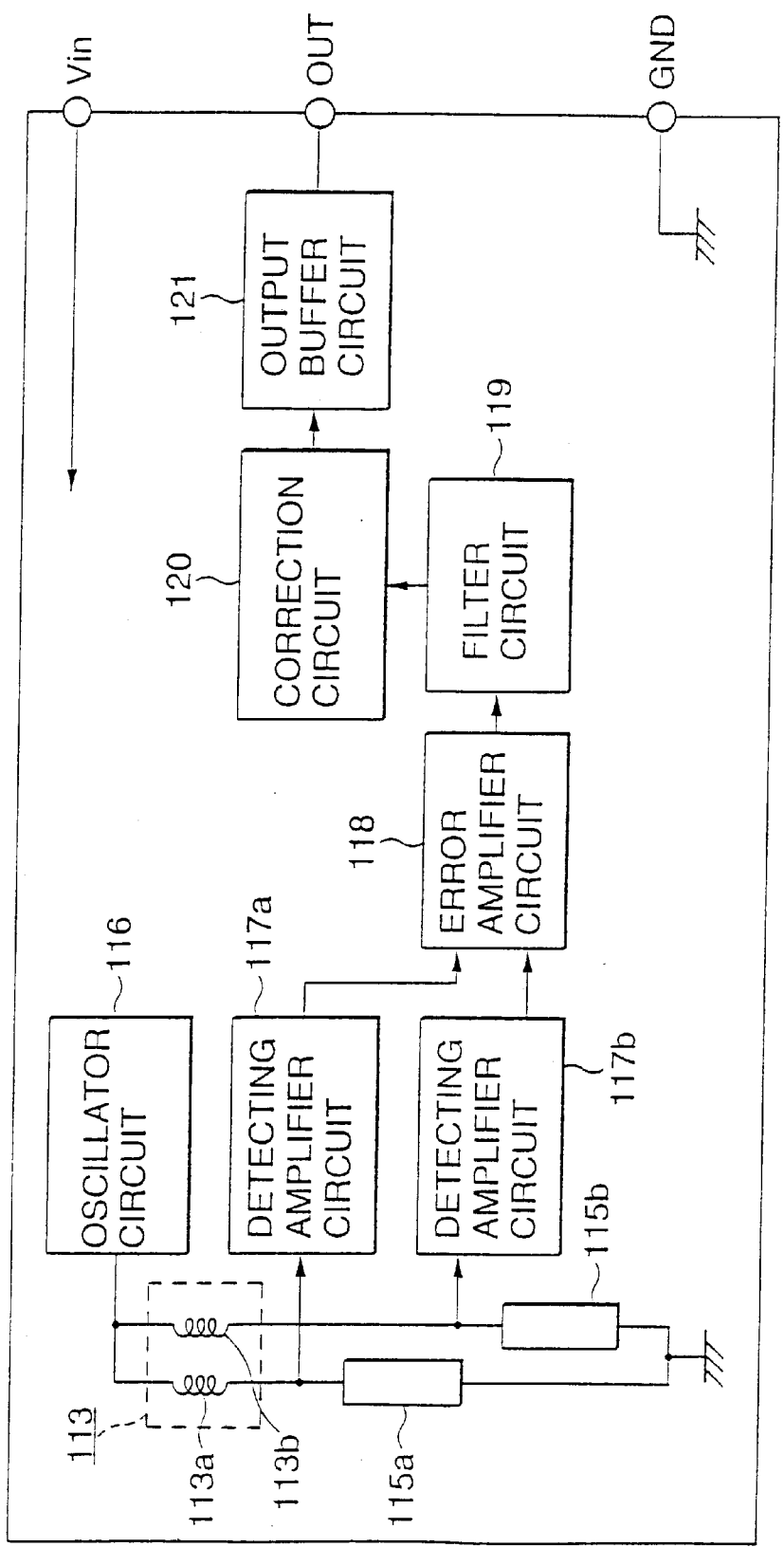
FIG. 18 is a circuit diagram illustrating the seventh embodiment of the present invention.

As shown in FIG. 18, the sensor 114 has an oscillation circuit 116 exciting and driving two sensor coils 113a and 113b by flowing a high frequency current therethrough, detecting amplifier circuits 117a and 117b for detecting and amplifying a voltage signal generated in response to a current flowing into resistors 115a and 115b connected in series to the sensor coils 113a and 113b, an error amplifier circuit 118 for outputting the difference between the detecting amplifier circuits 117a and 117b with one output serving as the reference value, a filter circuit 119 for eliminating a ripple component included in an output of the error amplifier circuit 118, a correction circuit 120 including a digital trimming circuit for subjecting a drift correction, a gradient correction, a temperature correction or the like and an output buffer circuit 121 for outputting a signal, outputted from the correction circuit 120 with decreasing an output impedance, to Electrical Control Unit (ECU) from the output terminal OUT as a detecting signal. A power supply voltage is supplied from a power supply terminal Vin to each circuit as power supply.

The sensor circuit operation 114 will be described hereinbelow.

Primary, when the arm portion 112a and 112b of the movable metal member 112 do not exist into the sensor coil 113a and 113b, an impedance Z of the sensor coil 113a and 113b corresponds to a combined value of wire wound resistors $rL_0$.

$$Z = j\omega L_0 + rL_0 \quad (4)$$

At this time, the sensor coils 113a and 113b are driven by the oscillation circuit 116 with a constant amplitude to maintain a driving condition with a constant coil current.

Under this circumstance, the arm portions 112a and 112b of the movable metal member 112 are inserted into the sensor coil 113a and 113b to pass magnetic flex through the arm portions 112a and 112b. As a result, the sensor coils 112a and 112b magnetic resistance is increased so that the impedance Z of the sensor coil 112a and 112b corresponds to a combined value of the inductance L and wire wound resistance rL.

$$Z = j\omega L + rL \quad (5)$$

Such kind of change is continuously occurred along with the movement of the continuous movable metal member 112 except a singular point or an extremum.

The sensor circuit 114 changes such kind of condition change to DC voltage signal. The sensor circuit 114 operation will be described hereinbelow.

Primary, the sensor coil 113a and 113b are driven by the oscillation circuit 116 to generate a high frequency modulated magnetic field.

When the arm portions 112a and 112b of the movable metal member 112 are inserted into the sensor coils 113a and 113b, the magnetic permeability is changed to increase the coil inductance L. When the sensor coils 112a and 112b are driven with the constant amplitude, there is decreased the coil current I flowing to the sensor coils 113a and 113b.

In this embodiment, an occupation amount with respect to the magnetic circuit determined by the insertion of the arm portion 112a and 112b of the movable metal member 112 into the sensor coils 113a and 113b is complementary changed from each other. Thus, when the inductance is increased about ΔL at the sensor coil 113a, the inductance is decreased about ΔL at the sensor coil 113b. At the same way, the coil current I flowing into the sensor coil 113a is decreased about ΔI and the coil current I flowing into the sensor coil 113b is increased about ΔI.

The coil current I described above is drawn by converting the voltage signal from the resistors 115a and 115b connected in serious to the sensor coils 113a and 113b.

The coil current I flowing to the sensor coils 113a and 113b is expressed by the following equation:

$$I = V/Z = V/(\omega^2 L^2 + rL^2)^{1/2} \quad (6)$$

where, V: oscillation amplitude of the oscillation circuit 116; Z: a coil impedance; rL: a coil wound resistance and L: a coil inductance.

$$Z = j\omega L + rL \quad (7)$$

In general, an air-core coil inductance is proportional to a magnetic permeability $\mu 0$. If the magnetic material having the magnetic permeability $\mu$ is located on the center axis, the inductance is increased in response to the occupation amount of the magnetic material located on the magnetic circuit.

The signal converted to the voltage signal in each resistor 115a and 115b is cut out in an original oscillation frequency by the detecting amplifier circuits 117a and 117b, and is converted to a DC voltage change in response to a rotation angle of the rotation shaft 111 by the error amplifier circuit 118.

However, this DC voltage still contains a ripple corresponding to the oscillation frequency component of the oscillation circuit 116. This ripple is eliminated by the filter circuit 119, and the correction is subjected by the correction circuit 120 constituted by the digital trimming circuit, that is, the correction circuit 120 subjects a drift correction, a gradient correction, a temperature correction or the like. As described above, the output buffer circuit 121 decreases the impedance from the DC voltage signal after eliminating ripple and subjecting the corrections, and the DC voltage signal is outputted from the output terminal OUT as the detecting signal. The Electrical Control Unit, into which the detecting signal is inputted, judges the rotation angle of the rotating shaft 111 in view of the detecting signal voltage, which corresponds to the position of the automatic transmission. The control operation is performed on the basis of this judgement.

According to the construction described above, because the rotating shaft 111 is arranged on a center position which is drawn to trace the arc trajectory of the movable metal member 112, there is no change in the positional relationship between the sensor coil portion 113 and the rotating shaft 111 so that the sensor coil portion 113 is free from the magnetic influence. Moreover, the thermal expansion of the rotating shaft 111 does not cause such influence. Further, if the thermal expansion were to occur, there would be little influence on the relationship between the sensor coils 113a and 113b and the arm portions 112a and 112b of the movable metal member 112 due to the whole structure being of similar construction. Further, if the movable metal member 112 causes only the large thermal expansion, the positional relationship between the movable metal member 112 and the two sensor coils 113a and 113b is symmetrical, with respect to the rotation angle 0° as the reference, so that the arm portions 112a and 112b of the movable metal member 112 are equally changed to cancel the effect by the detecting signal processing.

Of course, the present invention is not limited by this embodiment. It is applicable for using a differential amplifier in stead of the error amplifier.

Eighth Embodiment

Figure 19:
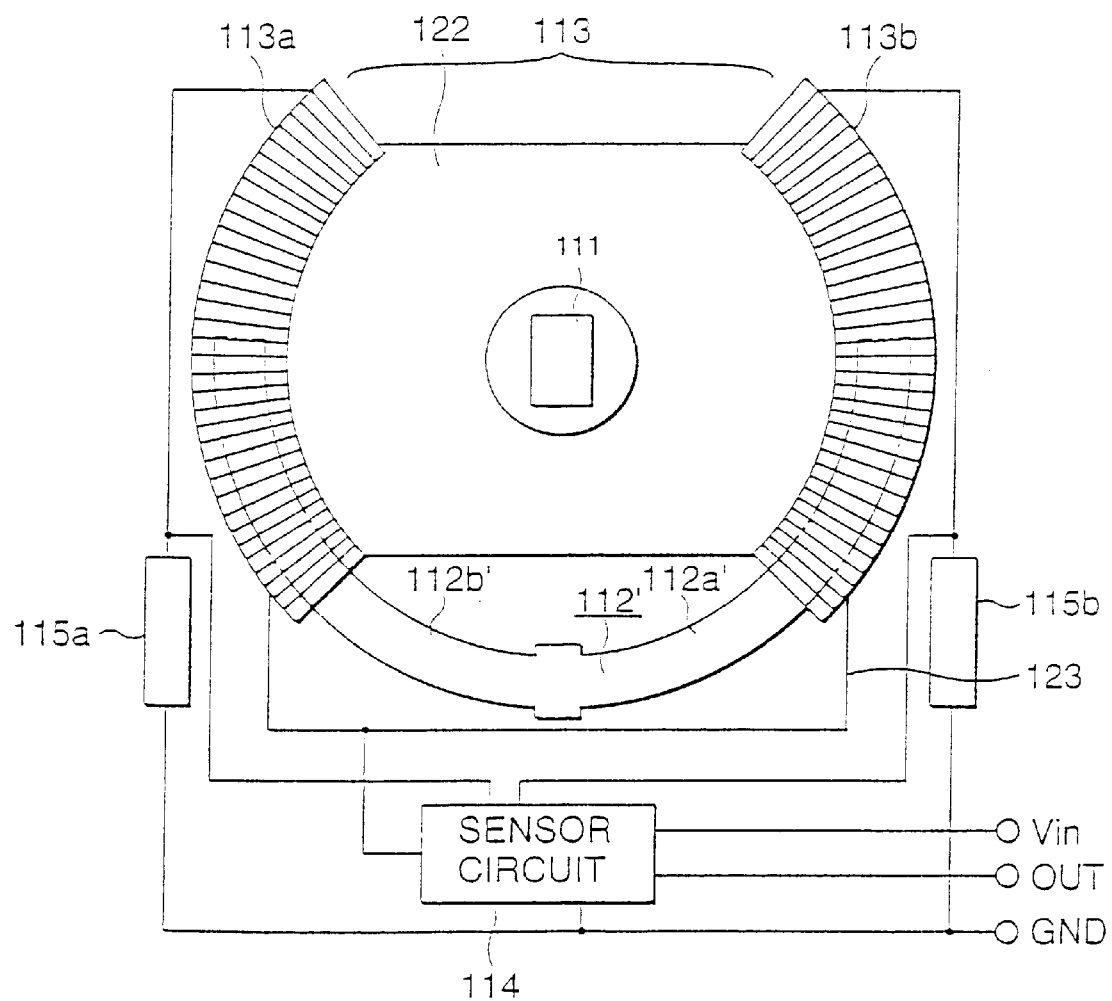
FIG. 19 is a schematic illustrating an eight embodiment of the present invention.

In the seventh embodiment, the movable metal member 112 rotates along the rotation of the rotating shaft 111. In the eight embodiment, as shown in FIG. 19, the arc shaped sensor coils 113a and 113b are mounted on an outer circumferential surface of a rotation plate 122 fixed on the rotating shaft 111. On the other hand, the middle portion of the arc-shaped fixing metal member 112' is fixed on the substrate 123 in such a manner that a gap is defined between the substrate 123 and the arm portions 112a' and 112b' of the movable metal member 112 so that the arm portions 112a' and 112b' of the fixing metal member 112' are freely movable into the sensor coils 113a and 113b moving rotationally. In this embodiment, as in the seventh embodiment, a rotation angle of the rotation shaft 111 becomes to 90° and a 270° rotation region is obtained. In this embodiment, the gear ratio could be smaller in the rotation angle of the rotation shaft 111.

The sensor according to a first aspect of the present invention has the effect in that the position of the shaft to be detected can be accurately detected. This is because of the fact that even when the characters of the detection coil itself vary with temperature, such variation in the characters of the coil itself are canceled by obtaining the difference between an oscillation signal, which is outputted from the detection coil according to an inserted state of the shaft to be detected, and an oscillation signal outputted from the reference coil.

The sensor according to a second aspect of the present invention can enhance the effect of the sensor according to first aspect of the present invention in that the position of the shaft to be detected can be accurately detected. This is because of the fact that even when the values of the physical properties, namely, magnetic permeability and dimensions of the detection coil itself is varied with temperature by inserting the reference shaft having the same specifications as those for the shaft to be detected, such variation in the characters of the coil itself are canceled by obtaining the difference between an oscillation signal, which is outputted from the detection coil according to an inserted state of the shaft to be detected, and an oscillation signal outputted from the reference coil.

The sensor according to a third aspect of the present invention is configured so that the drive oscillator circuits generate high-frequency magnetic fields according to oscillation signals outputted from the reference detection circuit among oscillation signals adapted to change in accordance with variation in a state in which the high-frequency magnetic fields are generated by the drive oscillator circuits. Thus, variation in the state, in which the high-frequency magnetic fields are generated by the drive oscillator circuits, is reduced. Consequently, the sensor according to claim 3 can enhance the effect of the sensor according to the first aspect of the present invention in that the position of the shaft to be detected can be accurately detected.

The sensor according to a fourth aspect of the present invention is configured so that an occurrence of magnetic mutual interference between the detection coil and the reference coil is prevented by the shield members for providing magnetic shielding between the detection coil and the reference coil. Thus, oscillation signals are accurately outputted from both the coils. Consequently, the sensor according to claim 4 can enhance the effect of the sensor according to the first aspect of the present invention in that the position of the shaft to be detected is accurately detected.

The sensor according to a fifth aspect of the present invention is configured so that even when the characters of the detection coil itself vary with temperature, such variation in the characters of the coil itself is canceled by obtaining the difference between oscillation signals outputted from the detection coil and the reference coil according to an inserted state of the common shaft to be driven by the shaft to be detected, and an oscillation signal outputted from the reference coil. Thus, the position of the common shaft can be accurately detected. Consequently, this sensor can accurately detect the position of the shaft to be detected, which is disposed in such a manner as to be able to drive the common shaft in a direction in which the common shaft is inserted in each of the detection coil and the reference coil.

Moreover, the common shaft is inserted into the detection coil and the reference coil so that a total of the dimension of a part thereof, which is inserted into the detection coil, and the dimension of a part thereof, which is inserted into the reference coil, is a predetermined dimension. Thus, as the dimension of the part of the common shaft, which part is inserted into one of the detection coil and the reference coil, increases, the dimension of the part of the common shaft, which is inserted into the other of the detection coil and the reference coil, decreases. Therefore, the oscillation signals respectively outputted from both the detection coil and the reference coil are symmetric signals that are equal in the absolute value of the amplitude thereof but different in the sign thereof, namely, have positive and negative signs, respectively. Consequently, noise components, whose magnitudes are considered as being almost equal to each other, are canceled by obtaining the difference between such symmetrical signals. Hence, the sensor according to the fifth aspect of the present invention can enhance the effects in that the position of the shaft to be detected is accurately detected.

The sensor according to a sixth aspect of the present invention is adapted so that the drive oscillator circuits generate according to oscillation signals that change in accordance with variation in a state in which the high-frequency magnetic fields are generated by the drive oscillator circuits. Thus, the variation in the state, in which the high-frequency magnetic field are generated by the drive oscillator circuits, is reduced, so that the position of the common shaft can be accurately detected. Consequently, the sensor according to claim 6 can enhance the effect of the sensor according to the fifth aspect of the present invention in that the position of the shaft to be detected can be accurately detected.

The sensor according to seventh aspect of the present invention has the following effects in addition to the effects of the sensor according to fifth or sixth aspect of the present invention. That is, in the case that both the first bridge element and the second bridge element are chip components, the capacitor constituted by a chip component does not contain lead, differently from a resistor constituted by a chip component. Thus, lead is not dissolved by being heated when the chip components are soldered. Consequently, the reliability in the soldering is not impaired by the dissolved lead.

According to the eight aspect of the present invention, there is provided the magnetic sensor comprising a rotating shaft rotating interlockingly with the object to be detected, an arc-shaped metal member interlocked with the rotation of the rotating shaft and moving on a circular trajectory thereof with said rotating shaft serving as a center thereof, a sensor coil portion fixed on the circular trajectory with a center axis bending to an arc-shaped in order to freely adjust an occupation amount with respect to the magnetic circuit in response to the movement of the metal member into a center air core of the sensor coil portion and a sensor circuit generating a signal corresponding to a rotation angle of the rotation shaft by detecting a magnetically change of the sensor coil portion generated in response to the movement of the metal member in the sensor coil portion under a condition that a modulated magnetic field with a high frequency is generated by driving and exciting the sensor coil portion.

A ninth aspect of the present invention, there is provided a magnetic sensor comprising a rotating shaft rotating interlockingly with the object to be detected, an arc-shaped metal member fixedly arranged on a circular trajectory thereof with said rotating shaft serving as a center thereof, a sensor coil portion with a center axis along the circular trajectory, moving on the circular trajectory by interlocking the rotation of the rotating shaft, the sensor coil portion formed in an arc-shaped in order to freely adjust an occupation amount with respect to the magnetic circuit in response to the movement of the metal member into the center air-core of the sensor coil portion and a sensor circuit generating a signal corresponding to a rotation angle of the rotation shaft by detecting a magnetically change of the sensor coil portion generated in response to the movement of the metal member in the sensor coil portion under a condition that a modulated magnetic field with a high frequency is generated by driving and exciting the sensor coil portion. Thus, the external rotation shaft is not influence in a magnetically to the sensor coil portion. It is not necessary to employ the countermeasure such as the addition of a non-magnetic member, separately, and it is possible to obtain the minimization. Further, the rotation shaft is positioned on a center point of a circle with respect to the arc-shaped metal member so that the position relationship between the sensor coil portion and the arc-shaped member is not changed by rotating the rotation shaft so that the sensor coil portion is free from the magnetic influence and the thermal expansion of the rotation shaft. Thus, there is achieved the advantage such that the temperature correction is not necessary under condition as the sensor attached.

A tenth aspect of the present invention, the sensor coil portion includes two sensor coils arranged such that sensors are arranged symmetrically with respect to a line passing through the rotation shaft serving as a rotation center, the arm portions extending from the middle point of the metal member are inserted into each sensor coil, respectively, when the rotation shaft rotates from the rotation angle 0°, the relationship between an occupation amount with respect to the magnetic circuit in response to the movement of one arm portion into the corresponding sensor coil and an occupation amount with respect to the magnetic circuit in response to the movement of the other arm portion into the corresponding sensor coil is maintained in the complementary change. The sensor circuit generates a signal corresponding he rotation angle of the rotation shaft on the basis of the magnetically change with respect to the both sensor coils. Thus, when the rotation shaft is thermally expanded, the phenomenon is not seriously influence to the sensor, because the positional relationship between the metal member and each sensor coil of the sensor coil portion is constricted in similarity as a whole. Further, if the metal member is thermally expanded, the influence is cancelled by subjecting the signal processing to maintain the stable detection because the sensor coil portion is arranged or the arm portions are provided symmetrically with respect to a reference as the rotating shaft rotation 0°.

The present disclosure relates to subject matter contained in Japanese Patent Application Nos. HEI 10-365413, filed on Dec. 22, 1998, and HEI 11-147336, filed on May 26, 1999, the contents of both being herein expressly incorporated by reference in their entireties.

What is claimed is:

1. A magnetic sensor comprising:

a rotating shaft that interlockingly rotates with an object to be detected;

an arc-shaped metal member, interlocked with the rotating shaft to rotate with the rotating shaft along a circular trajectory around a center of the rotating shaft, the arc-shaped metal member comprising a plurality of arm portions that extend along substantially half of a circumference of a circle defined by the circular trajectory;

a pair of opposing arc-shaped sensor coils, symmetrically positioned around the rotating shaft on the circular trajectory, each of the arc-shaped sensor coils defining a center air core, which is partially occupied by at least a portion of a corresponding one of the plurality of arm portions; and a sensor circuit that excites the sensor coils and detects a magnetic change in a high frequency modulated magnetic field, generated by each sensor coil in response to a movement of the rotating shaft, which causes each of the plurality of arm portions to move within the respective sensor coil center air cores, the sensor circuit generating a signal indicating a rotation angle of the rotating shaft based on the magnetic change detected from each sensor coil;

wherein a relationship between occupation amounts of the plurality of arm portions within the corresponding center air cores remains complementary throughout the movement of the rotating shaft.

2. The magnetic sensor according to claim 1, each of the arc-shaped sensor coils having a length substantially equal to one quarter of the circumference of the circle.

3. A magnetic sensor comprising:

a rotating shaft that interlockingly rotates with an object to be detected;

an arc-shaped metal member, fixedly positioned in a circular trajectory around a center of the rotating shaft, the arc-shaped metal member comprising a plurality of arm portions that extend along substantially half of a circumference of a circle defined by circular trajectory;

a pair of opposing arc-shaped sensor coils, symmetrically positioned around the rotating shaft along the circumference of the circle, that interlockingly rotates with the rotation of the rotating shaft, each of the arc-shaped sensor coils defining a center air core, which is partially occupied by at least a portion of a corresponding one of the plurality of arm portions; and a sensor circuit that excites the sensor coils and detects a magnetic change in a high frequency modulated magnetic field, generated by each sensor coil in response to the movement of the metal member in the respective sensor coil center air cores, the sensor circuit generating a signal indicating a rotation angle of the rotating shaft based on the magnetic change detected from each sensor coil;

wherein a relationship between occupation amounts of the plurality of arm portions within the corresponding center air cores remains complementary throughout the movement of the rotating shaft.

4. The magnetic sensor according to claim 3, shaped sensor coils having a length of substantially one quarter of the circumference of the circle.

5. A magnetic sensor for detecting a rotation angle of a rotatable object, the magnetic sensor comprising:

a rotating shaft that interlockingly rotates with the rotatable object;

an arc-shaped metal member, comprising a first arm and a second arm that define substantially half of a circumference of a circle around a center of the rotating shaft;

a pair of opposing arc-shaped sensor coils, symmetrically positioned around the center of the rotating shaft on the circumference of the circle, a first arc-shaped sensor coil defining a first center air core, and a second arc-shaped sensor coil defining a second center air core, the first arm occupying a portion of the first center air core and the second arm occupying a complementary portion of the second center air core; and a sensor circuit that excites the pair of arc-shaped sensor coils to create corresponding magnetic fields;

wherein a rotational movement of the rotating shaft causes a corresponding relative movement between the arc-shaped metal member and the pair of arc-shaped coils, such that the portion of the first air core occupied by the first arm changes complementary to the portion of the second air core occupied by the second arm; and wherein the sensor circuit detects changes in the magnetic fields generated by the pair of arc-shaped sensor coils, based on the complementary changes to the portion of the first air core occupied by the first arm and to the portion of the second air core occupied by the second arm, and indicates the rotation angle of the rotatable object based on the detected magnetic field changes.

6. The magnetic sensor according to claim 5, the arc-shaped metal member interlockingly rotating with the rotating shaft, such that the relative movements comprise the first and second arms moving through stationary first and second arc-shaped sensor coils, respectively.

7. The magnetic sensor according to claim 5, the pair of arc-shaped sensor coils interlockingly rotating with the rotating shaft, such that the relative movements comprise the first and second arc-shaped sensor coils moving around stationary first and second arms, respectively.

8. The magnetic sensor according to claim 5, each of the first arc-shaped sensor coil and the second arc-shaped sensor coil being substantially one quarter of the circumference of the circle in length.

* * * * *

UNITED STATES PATENT AND TRADEMARK OFFICE
CERTIFICATE OF CORRECTION

PATENT NO.     : 6,600,311 B1
DATED          : July 29, 2003
INVENTOR(S)    : S. Tawaratsumida et al.

It is certified that error appears in the above-identified patent and that said Letters Patent is hereby corrected as shown below:

<u>Column 17,</u>
Line 1, "shaped" should be -- each of the arc-shaped --.

Signed and Sealed this

Eighteenth Day of May, 2004

JON W. DUDAS
*Acting Director of the United States Patent and Trademark Office*